(12) United States Patent
Devlin et al.

(10) Patent No.: US 11,797,810 B2
(45) Date of Patent: Oct. 24, 2023

(54) MACHINE-READABLE LABEL GENERATOR

(71) Applicant: The DTX Company, New York, NY (US)

(72) Inventors: Patrik Andrew Devlin, New York, NY (US); Corey Benjamin Daugherty, Barrington, RI (US); Ahmad Askarian, Philadelphia, PA (US); David Shing, Brookhaven, NY (US); Neil Wayne Cohen, Oakton, VA (US); Saul Lewis Stetson, Jersey City, NJ (US); Richard Przekop, Weston, MA (US)

(73) Assignee: the dtx company, New York, NY (US)

( * ) Notice: Subject to any disclaimer, the term of this patent is extended or adjusted under 35 U.S.C. 154(b) by 97 days.

(21) Appl. No.: 17/244,032

(22) Filed: Apr. 29, 2021

(65) Prior Publication Data
US 2022/0044087 A1 Feb. 10, 2022

Related U.S. Application Data

(63) Continuation of application No. 16/988,678, filed on Aug. 9, 2020, now Pat. No. 11,205,105.

(51) Int. Cl.
*G06K 19/06* (2006.01)
(52) U.S. Cl.
CPC ... *G06K 19/06037* (2013.01); *G06K 19/0614* (2013.01); *G06K 19/06075* (2013.01); *G06K 19/06103* (2013.01); *G06K 19/06131* (2013.01)

(58) Field of Classification Search
CPC ....... G06K 19/06037; G06K 19/06075; G06K 19/06131; G06K 19/0614; G06K 19/06103; G06K 19/06; G06Q 10/00; G06Q 20/3276
See application file for complete search history.

(56) References Cited

U.S. PATENT DOCUMENTS

| | | |
|---|---|---|
| 7,504,949 B1 | 3/2009 | Rouaix et al. |
| 9,201,975 B2 | 12/2015 | Hall |
| 9,936,249 B1 | 4/2018 | Nelson et al. |
| 10,375,060 B1 | 8/2019 | Graves et al. |
| 10,460,138 B2 | 10/2019 | Barnum |
| 10,803,432 B1 | 10/2020 | Miles |

(Continued)

OTHER PUBLICATIONS

App No. PCT/US2021/44963 International Search Report and Written Opinion of the International Searching Authority, dated Nov. 3, 2021.

(Continued)

*Primary Examiner* — Thien M Le
(74) *Attorney, Agent, or Firm* — Weiss & Arons LLP

(57) ABSTRACT

Software tools disclosed herein may allow a user to enter design choices that alter an aesthetic appearance of a machine-readable label such that modules included in the label deviate from a standardized definition for the modules. Such alterations may include changes in size, color and orientation of modules. The alterations may allow a user to create machine-readable labels having unique aesthetic appearances. A software engine may ensure that, despite the aesthetic design choices entered by a user, the generated machine-readable label is reliably scannable.

26 Claims, 15 Drawing Sheets
(12 of 15 Drawing Sheet(s) Filed in Color)

(56) References Cited

U.S. PATENT DOCUMENTS

| | | | |
|---|---|---|---|
| 10,963,868 B1 | 3/2021 | McCauley et al. | |
| 11,106,753 B1 | 8/2021 | Fowler et al. | |
| 11,182,768 B2 | 11/2021 | Fowler et al. | |
| D939,570 S | 12/2021 | Dye et al. | |
| 11,206,432 B1 | 12/2021 | Fowler et al. | |
| 11,263,282 B2 | 3/2022 | Fowler et al. | |
| 11,347,823 B2 | 5/2022 | Askarian et al. | |
| 11,379,820 B2* | 7/2022 | Mossoba | G06Q 20/223 |
| 2002/0032791 A1 | 3/2002 | Isherwood et al. | |
| 2002/0139839 A1 | 10/2002 | Catan | |
| 2004/0123223 A1 | 6/2004 | Halford | |
| 2004/0246529 A1 | 12/2004 | Pruden et al. | |
| 2006/0196950 A1 | 9/2006 | Kiliccote | |
| 2006/0215931 A1* | 9/2006 | Shimomukai | H04N 1/32251 382/284 |
| 2007/0035327 A1 | 2/2007 | Baeckler et al. | |
| 2007/0286455 A1 | 12/2007 | Bradley | |
| 2010/0128921 A1 | 5/2010 | Alattar et al. | |
| 2011/0290882 A1* | 12/2011 | Gu | G06K 7/1456 235/462.11 |
| 2012/0206648 A1 | 8/2012 | Casagrande et al. | |
| 2012/0256732 A1 | 10/2012 | McAllister | |
| 2012/0278465 A1 | 11/2012 | Johnson | |
| 2013/0112760 A1 | 5/2013 | Schory et al. | |
| 2013/0197992 A1* | 8/2013 | Bao | G06Q 30/0239 705/14.43 |
| 2013/0215475 A1 | 8/2013 | Noguchi | |
| 2013/0228624 A1 | 9/2013 | Byrd et al. | |
| 2013/0297430 A1 | 11/2013 | Soergel | |
| 2014/0001253 A1 | 1/2014 | Smith | |
| 2014/0095461 A1 | 4/2014 | Burt | |
| 2015/0014417 A1 | 1/2015 | Finlow-Bates et al. | |
| 2015/0048169 A1 | 2/2015 | Doberschutz | |
| 2015/0099946 A1 | 4/2015 | Sahin | |
| 2015/0262221 A1 | 9/2015 | Nakano et al. | |
| 2015/0324678 A1 | 11/2015 | Simske et al. | |
| 2016/0148083 A1 | 5/2016 | Osborne et al. | |
| 2016/0162767 A1 | 6/2016 | Ito et al. | |
| 2016/0189016 A1 | 6/2016 | Windmueller et al. | |
| 2016/0247423 A1 | 8/2016 | Hohl et al. | |
| 2016/0364825 A1* | 12/2016 | Pan | H04N 19/44 |
| 2017/0264608 A1 | 9/2017 | Moore et al. | |
| 2017/0300854 A1 | 10/2017 | Harcar et al. | |
| 2018/0365330 A1 | 12/2018 | Lin et al. | |
| 2019/0089757 A1 | 3/2019 | Sorensen et al. | |
| 2019/0138721 A1 | 5/2019 | Wojnowicz et al. | |
| 2019/0221293 A1 | 7/2019 | Zhang | |
| 2019/0234975 A1 | 8/2019 | Pothini et al. | |
| 2019/0258814 A1 | 8/2019 | Heeter | |
| 2019/0281030 A1 | 9/2019 | Isaacson et al. | |
| 2019/0281124 A1 | 9/2019 | Lim et al. | |
| 2020/0356080 A1 | 11/2020 | Principato | |
| 2020/0356083 A1 | 11/2020 | Principato | |
| 2020/0356741 A1 | 11/2020 | Principato | |
| 2020/0394699 A1 | 12/2020 | Mueller | |
| 2021/0042730 A1 | 2/2021 | Lee | |
| 2021/0056541 A1 | 2/2021 | Kim | |
| 2021/0217006 A1 | 7/2021 | Ragavan et al. | |
| 2021/0256086 A1* | 8/2021 | Askarian | G06K 19/06037 |
| 2021/0271803 A1 | 9/2021 | Seymour et al. | |
| 2021/0287202 A1 | 9/2021 | Fowler et al. | |
| 2021/0334490 A1 | 10/2021 | Luk et al. | |
| 2021/0357715 A1* | 11/2021 | Schimke | G06K 19/06103 |
| 2021/0377263 A1 | 12/2021 | Law | |
| 2022/0215190 A1 | 7/2022 | Cohen et al. | |
| 2022/0253811 A1 | 8/2022 | Fowler et al. | |
| 2022/0374664 A1* | 11/2022 | Zhou | H04N 1/40012 |

OTHER PUBLICATIONS

Inderscience Enterprises Ltd., Wickramasinghe et al., "A Mathematical Model for Computational Aesthetics," pp. 310-324, Jan. 15, 2011, Int. J. Computational Vision and Robotics, 2010 vol. 1, No. 3.

Elsevier, Maity et al., "A Computational Model to Predict Aesthetic Quality of Text Elements of GUI," pp. 152-159, Dec. 2016, Procedia Computer Science 84 (2016), www.sciencedirect.com.

AI Shack, Utkarsh Sinha, "Scanning QR Codes," 2010, https://aishack.in/tutorials/scanning-qr-codes-1/.

AIA Vision Online, "The Most Common Causes of Unreadable Barcodes," Apr. 15, 2015, https://www.visiononline.org/vision-resources-details.cfm?content_id=5404.

Workwithcolor.com, "Color Properties/Terminology," Retrieved on Jun. 8, 2020, http://www.workwithcolor.com/color-properties-definitions-0101.htm.

The Eurographics Association, Florian Hoenig, "Defining Computational Aesthetics," pp. 13-18, 2005, Computational Aesthetics in Graphics, Visualization and Imaging (2005), www.diglib.eg.org.

DataGenetics, "Wounded QR Codes," Nov. 2013, http://datagenetics.com/blog/november12013/index.html.

QR Code Monkey, "6 Reasons Why Your QR Code Is Not Working," Retrieved on Jun. 9, 2020, https://www.qrcode-monkey.com/6-reasons-why-your-qr-code-is-not-working.

Techspot, Inc., Mark Turner, "QR Codes Explained," Sep. 3, 2018, https://www.techspot.com/guides/1676-qr-code-explained/.

Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.

Thonky.com, "Module Placement in Matrix," Retrieved on Jun. 8, 2020, https://www.thonky.com/qr-code-tutorial/module-placement-matrix.

Keyence Corporation of America, "What Is A QR Code," Retrieved on Jun. 8, 2020, https://www.keyence.com/ss/products/auto_id/barcode_lecture/basic_2d/qr/.

Wikimedia Foundation, Inc., "QR Code," Retrieved on Jun. 3, 2020, https://en.wikipedia.org/wiki/QR_code.

Wikimedia Foundation, Inc., Walter Tuveli, "QR Code—Structure," 2012, https://en.wikipedia.org/wiki/QR_code#/media/File:QRCode-2-Structure.png.

U.S. Patent and Trademark, Non-Final Office Action in U.S. Appl. No. 17/078,622, filed Dec. 22, 2020.

U.S. Patent and Trademark, Non-Final Office Action in U.S. Appl. No. 16/988,678, filed May 11, 2021.

Wikimedia Foundation, Inc., "ShotCode," https://en.wikipedia.org/wiki/ShotCode#searchInput, Retrieved on Aug. 6, 2021.

Www.medium.com, Punit Pathak, "ETL-Understanding It and Effectively Using It," https://medium.com/hashmapinc/etl-understanding-it-and-effectively-using-it-f827a5b3e54d, Jan. 7, 2019.

Strathmore University (Nairobi, Kenya), Kizi Dimira Othuon, "Improving Customer Experience Using an Android Barcode Reader Application," https://su-plus.strathmore.edu/bitstream/handle/11071/5978/Improving%20customer%20shopping%20experience%20using%20an%20Android%20barcode%20reader%20application.pdf?sequence=1&isAllowed=y, Apr. 2018.

Horrigan, Aidan, "Mr. WHS 2020," www.westboroughtv.org, https://westboroughtv.org/mr-whs-2020-2/, Jun. 12, 2020.

Wa, Izakaya, "QR codes for the dinner menu and lunch menu at Memorial!" www.facebook.com, https://m.facebook.com/196433773873837/posts/qr-codes-for-the-dinner-menu-and-lunch-menu-at-memorial.1730306280486571, Jul. 24, 2020.

"StockX TV Spot, 'Flowcode: Never Sold Out,'" www.ispot.tv, https://www.ispot.tv/ad/nVly/stockx-flowcode-never-sold-out, Mar. 27, 2020.

"#FitForTheFrontline Challenge Unites Nation's Top Medical Centers to Support Frontline Healthcare Workers," www.nyp.org, https://www.nyp.org/news/fit-for-the-frontline-challenge, May 28, 2020.

* cited by examiner

MACHINE-READABLE LABEL GENERATOR

CROSS REFERENCE TO RELATED APPLICATION

This application is a continuation of U.S. patent application Ser. No. 16/988,678 filed on Aug. 9, 2020, which is hereby incorporated by reference herein in its entirety.

COMPUTER PROGRAM LISTING APPENDIX

This application includes a computer program listing as an appendix. The appendix includes one (1) ASCII text file (submitted via EFS-Web). The appendix is hereby incorporated by reference herein in its entirety. The table below lists the ASCII text file included in the appendix:

| File No. | File Name | Date Created | File Size (kilobytes) |
|---|---|---|---|
| 1 | fc_grid_renderer.txt | Jul. 10, 2020 | 19 |

The computer program listing included in the appendix provides source code for implementing an illustrative machine-readable optical label generator in accordance with principles of the disclosure.

FIELD OF TECHNOLOGY

Aspects of the disclosure relate to technology for generating machine-readable optical labels such as quick-response ("QR") codes.

BACKGROUND

QR codes provide businesses with a fast and efficient medium for connecting with consumers. Instructions, such as URLs contact information and other alphanumeric information may be encoded in QR codes. Businesses may leverage QR codes to guide consumers to a desired destination (real or virtual) where the customers can access products or services provided by the business. However, a scanning device is needed to scan and interpret the instructions encoded in a QR code.

In 2010, 62.6 million people in the United States used smartphones. In 2020 that number is predicted to more than quadruple to 272.6 million. Commensurate with increased smartphone use is integration of technology into smartphones that scans and interprets QR codes. Today, many smartphones include a native camera application that can recognize QR codes. There is no need to download and install a separate QR reader application or use the separate QR reader to scan a QR code.

QR codes now potentially offer an inexpensive means of providing many consumers with easy access to products or services. Consumers are already using their smartphones to search for more information about a product/service of interest. Now, businesses can tap into this tendency by using QR codes to guide consumers to targeted content associated with a product/service. Furthermore, QR codes are inexpensive and easy to print on a variety of surfaces such as business cards, product packaging, posters or marketing materials.

However, one hurdle still facing widespread adoption of QR codes is that the instructions encoded in a QR code must follow regimented protocols. The regimented protocols ensure that encoded instructions can be successfully scanned and interpreted by a smartphone. Altering the regimented protocols to generate a QR code that includes aesthetic designs may interfere with the ability of a smartphone to reliably scan and interpret the encoded instructions.

It would be desirable to provide apparatus and methods for generating QR codes that include aesthetic designs that do not interfere with the ability of a smartphone to scan and interpret the encoded instructions. Accordingly, it is desirable to provide apparatus and methods for a MACHINE-READABLE LABEL GENERATOR.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
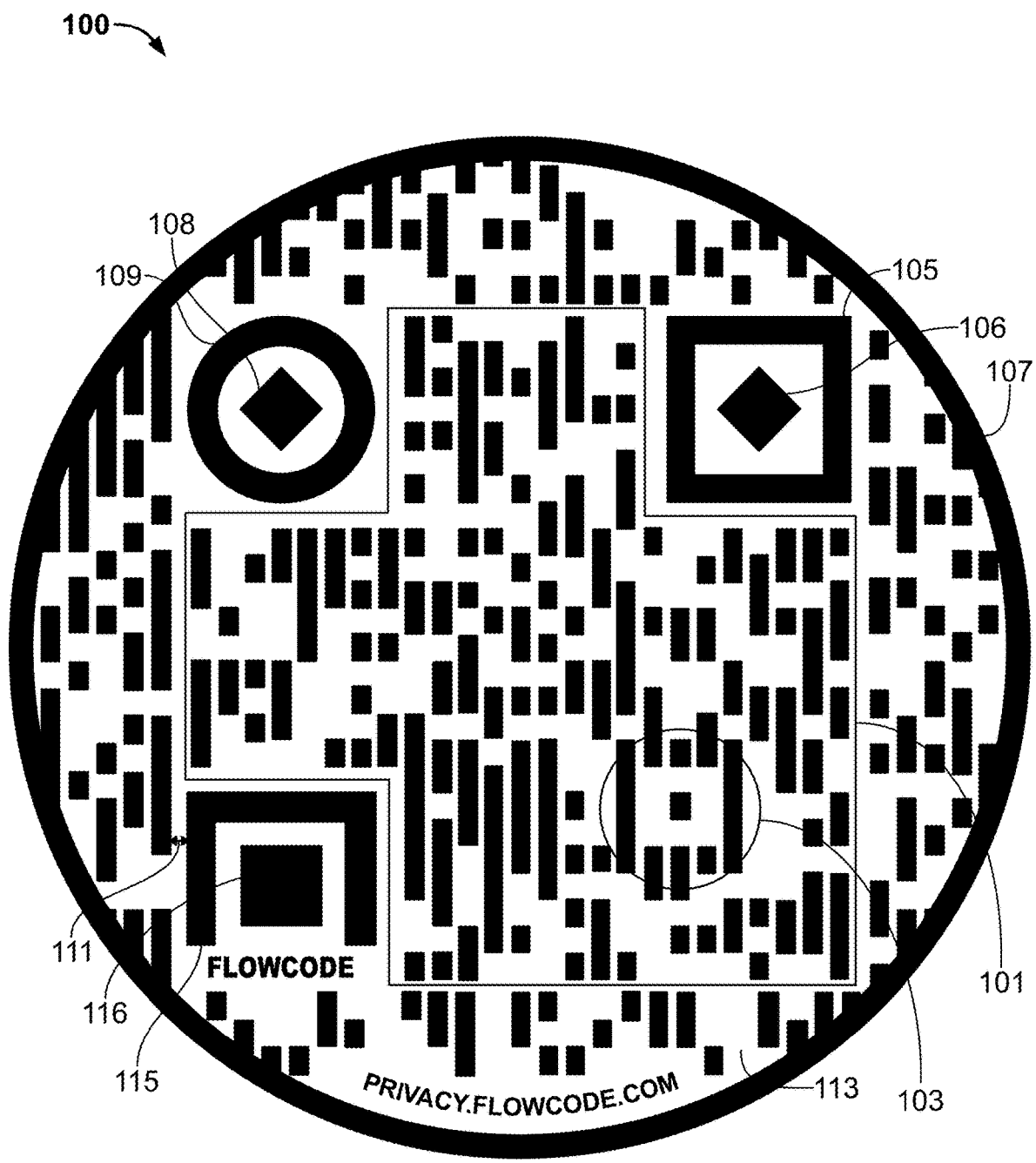
FIG. 1 shows components of an illustrative QR code in accordance with principles of the disclosure.

A system for generating a machine-readable optical label is provided. An illustrative machine-readable optical label may be a quick-response ("QR") code. Other illustrative machine-readable optical labels may include a linear barcode or a two-dimensional matrix barcode such as Aztec code, ShotCode, SPARQCode, and the like.

The system may include a software dashboard. The dashboard may include a user interface ("UI") that provides access to software tools for entering one or more design choices for a machine-readable optical label, such as a QR code. An associated software engine may generate a QR code based on the user entered design choices.

A QR code may include a plurality of modules. A module may be a dark module or a light module. A scanning device, such as a smartphone, may be configured to interpret instructions encoded by a pattern of light and dark modules. For example, the scanning device may interpret the pattern of modules as a binary encoded message. A light module may represent a 0, and a dark module may represent a 1.

A pattern of modules within a QR code may define a data zone, position detection patterns, timing patterns, an error correction level and error correction code. The data zone may include machine readable instructions that, when scanned, triggers an action on a device used to scan the QR code. For example, the QR code may include instructions for launching a webpage or text message application. The instructions encoded in the data zone may prefill a destination field of the text message or insert text into the body of a message. The instructions encoded in the data zone may trigger a display of information on the scanning device such as a product identifier or instructions on how to use the product. The more information included within the data zone, the more modules a QR code will have to encode that information.

Position detection patterns may provide instructions that orient a scanning device to identify and read the data zone. Position detection patterns may include position markers. For example, a QR code may include three position markers ("eyes") at a top left, top right, and bottom left of the QR code. Position markers may be defined based on a pattern of light/dark modules. For example, a position marker may be spaced apart from the data zone by a border of light modules. The position marker may include an outer border of dark modules. The outer border may surround an inner border of light modules. The inner border of light modules may surround a core of dark modules. A position mark may be designed to include a pattern of modules that is unlikely to appear elsewhere within the QR code.

Each position marker may be linked to another position marker by a timing pattern. An illustrative timing pattern may include a horizontal line of alternating light/dark modules. An illustrative timing pattern may include a vertical line of alternating light/dark modules. Each line of alternating light/dark modules may start and end with a dark module.

The position detection pattern may include an alignment pattern. An alignment pattern may overlap a timing pattern. The alignment pattern may include one or more alignment markers. An illustrative alignment marker may include an outer border of dark modules surrounding an inner border of light modules and a single dark module in the center of the marker.

The alignment pattern may allow a scanning device to determine an orientation of the QR code. The alignment pattern may improve scanning speed of the QR code. The alignment pattern may include markers or a pattern that allows a scanning device to orient the QR code despite displacement of modules due to distortion. For example, the alignment pattern may allow a device to scan QR codes applied to a curved surface. Generally, a larger QR code will include more alignment patterns than a smaller QR code. Size of a QR code may be defined based on a number of modules included in the QR code.

The QR code may include error correction code. The error correction code may be included in the data zone. An illustrative error correction code may include Reed-Solomon codes. The error correction code may be applied to restore data encoded by modules when a segment of a QR code is missing or damaged. A QR code may include various levels of error correction.

Modules used for error correction store redundant copies of data that compensate for damaged modules that cannot be read by a scanner. An exemplary target error correction level may allow restoration of at least 15% of data bytes. The target error correction level is determined based on Reed-Solomon codes included in the QR code. Other illustrative target error correction levels may include:

Level L—7% of data bytes can be restored.
Level M—15% of data bytes can be restored.
Level Q—25% of data bytes can be restored.
Level H—30% of data bytes can be restored.

A QR code that includes a 30% error correction level will be scannable by a device even if 30% of the modules are damaged (soiled, washed out, faded, replaced with images). Generally, the higher level of error correction included in the QR code, the less instructions can be stored within a data zone of the QR code.

The system may include a software engine. The software engine may include software tools that allow a user to enter design choices associated with a QR code or other machine-readable label. The software engine may generate a QR code based on design choices input by the user. The software engine may generate the QR code such that the QR code includes the user input design choices and has a target error correction level. The software engine may generate the QR code such that the QR code includes the user input design choices and is reliably scannable by a scanning device.

A QR code may include an environmental zone. The environmental zone may include a buffer of light modules that surround a data zone and associated position detection patterns. The buffer may allow a scanning device to distinguish the data zone from its surrounding environment zone. An illustrative buffer may be four light modules wide.

The software engine may generate an environmental zone for the QR code. The software engine may generate the buffer surrounding the data zone and position detection patterns. The software engine may generate modules for an environmental zone surrounding the data zone. The environmental zone of a QR code may include marks or designs that are not intended to be interpreted by a scanning device. The environmental zone may provide a QR code an aesthetic appearance that is different from a standardized appearance of a QR code. A standardized appearance of a QR code may be defined by one or more standards published by the International Organization for Standardization (ISO) of Geneva, Switzerland. Illustrative standards published by the ISO include ISO/IEC 18004:2015 and ISO/IEC 24778:2008 which are hereby incorporated herein by reference in their entireties.

The software engine may generate a data zone for the QR code. The software engine may generate the data zone based on design choices entered by a user. Exemplary design choices that may be presented by the software engine may include shapes, colors, color gradients and shading of one or more modules of the data zone. The software engine may generate a QR code based on the user's design choices such that the QR code has a scan recognition speed of 3 seconds or less. The software engine may dynamically adjust formulation of the environmental zone based on design choices associated with the data zone. The software engine may dynamically generate the data zone based on design choices associated with the environmental zone.

In response to detecting user entered design choices, the software engine may dynamically change the design choices applied to modules in the data zone to improve readability of the data zone. Illustrative changes may include alterations to size, shape, color of a module and position of a module relative to other modules. The software engine may change the user entered design choices applied to modules in the data zone such that, even after applying the altered design choices, the generated QR code maintains a desired appearance associated with the user entered design choices. Exemplary changes may include changing one or more of the following design choices applied to modules within the data zone: color, contrast, skew, blur, sharpness, hue, tint, brightness, shade, shape, gradient, tone, and saturation.

Changes to modules within a data zone may include redistributing two or more design choices applied to modules within the data zone. For example, the software engine may generate a data zone that adheres to colors or a color gradient entered by a user, but may redistribute the colors as applied to individual modules within the data zone. Such a redistribution may improve readability of the data zone by a scanning device.

Changes applied to modules within the data zone may include revising a mask pattern applied to a generated QR code. A mask pattern may rearrange modules in the data zone that may confuse a scanner. For example, applying a mask pattern may ensure that a generated QR code does not include a threshold number of adjacent modules having the same color. Masking may eliminate module patterns that may be erroneously interpreted by a scanner as a location, position or timing marker.

In some embodiments, the software engine may suggest a combination of design choices for the environmental and data zones based on a user's entered design choices. The combination of design choices suggested by the software engine may generate a QR code that has a threshold level of readability and error correction. The software engine may be configured to show an illustrative QR code that minimizes the number of changes to the user's design choices and generates a QR code having the threshold level of readability and error correction.

The software engine may be configured to minimize the number of changes to the user's design choices such that an appearance of the generated QR code is within a threshold range of the user's design choices. The software engine may apply machine learning techniques, such as fuzzy logic, to define an "appearance" based on user entered design choices.

The software engine may limit design choices available to a user. For example, the software engine may limit the user to design choices that allow generation of a QR code having a target scan error correction level. The software engine may dynamically determine design choices available to the user based on previously entered design choices. The software engine may determine design choices available to the user after receiving two or more user entered design choices.

Exemplary design choices that may be presented by the software engine may include shapes, colors, color gradients and shading of one or more modules of the QR code. For example, a design choice may include a shape or color of modules that define a position or timing marker of the QR code. A marker may include a plurality of modules arranged in specific positions with respect to each other.

Exemplary design choices that may be provided by the software engine to a user include shapes, colors, color gradients and shading of one or more modules within a QR code. Exemplary design choices that may be provided by the software engine to a user include shapes, colors, color gradients and shading of modules patterns within a QR code. Exemplary patterns may include a position pattern, an alignment pattern and a timing pattern. A pattern may include two or more markers positioned in a desired arrangement. A pattern may be included within a data zone, environmental zone or any other part of the QR code.

The software engine may allow the user to enter design choices that will be applied to a data zone of the QR code. A data zone may include modules that are arranged to encode computer executable instructions. When the QR code is scanned, the executable instructions may configure the scanning device to perform a target function. For example, the executable instructions may launch a web browser resident on the scanning device and load a target landing page. The executable instructions may trigger any suitable function of the scanning device. Other illustrative functions may include launching an email/text application on the scanning device or generating a pre-formatted message.

The data zone may include modules defining version and format information of the QR code. The data zone may include modules defining error correction codes. The data zone may include modules defining timing, position and alignment patterns.

The software engine may allow the user to enter design choices that will be applied to an environmental zone of the QR code. Illustrative design choices may include shapes, colors, color gradients and shading of modules or other marks included in the environmental zone.

The software engine may generate a QR code that includes the design choices entered by the user. The software engine may generate a QR code that includes the design choices entered by the user, constrained by an outer perimeter. An environmental zone may include all modules or marks positioned between a data zone and the outer perimeter. The environmental zone may include the outer perimeter. The software engine may be configured to produce a QR code having an outer perimeter having any suitable shape, such as circular, triangular, rectangular or trapezoidal outer perimeters. The software engine may generate fill for the environmental zone between the data zone and the perimeter.

The software engine may be configured to generate fill for the QR code. The fill may be a color or other design choice applied to light modules within the QR code. The software engine may generate fill that does not negatively impact a target scan speed or error correction level of the data zone.

Apparatus for a software platform for generating a customized quick-response ("QR") code is provided. The platform may include a first interface for constructing a data zone of the QR code. The first interface may construct the data zone based on a first set of design choices entered by a user. The first user interface may provide functionality for a user to enter design choices that will be applied to the data zone. The first set of user design choices may include the following illustrative design choices for the data zone:

shape of modules within the data zone
a color of modules within the data zone
a color gradient applied to the modules within the data zone
error correction level
image(s) or logo(s) displayed within the data zone.

Design choices for modules within the data zone may include design choice for light and dark modules. The platform may include a second interface. The second interface may provide functionality for constructing a position detection pattern of the QR code. The second user interface may provide functionality for inputting a second set of design choices that will be applied to one or more position detection patterns of the QR code. The data zone may include one or more position detection patterns.

Modules within the position detection pattern may orient a device attempting to extract information from a QR code. A position detection pattern may include one or more modules that define a position marker (an "eye") of the QR code. The position marker may include modules arranged in a specific formation. A QR code may include position markers at one or more corners of the data zone. A QR code may include position markers at one or more borders of a data zone of the QR code. A scanning device may locate the data zone by detecting the position markers.

A position marker may allow a scanning device to quickly locate the data zone, facilitating high-speed scanning of the QR code. A position marker is designed to include an arrangement of modules unlikely to appear elsewhere within other zones of a QR code. An illustrative position marker may include module widths having a ratio of 1:1:3:1:1. A position marker may include an outer border of 7×7 dark modules, an inner border of 5×5 light modules, and an inner core of 3×3 dark modules. A scanning device may search the QR code for arrangements of modules having this ratio of light to dark modules, detect the position markers and then scan the data zone in an orientation for decoding.

The second set of data inputs may define design choices for a position marker. A QR code may include two or more position markers. For example, an illustrative QR code may include three position markers. Illustrative design choices for each position marker included in a position detection pattern may include:
  a color of light modules included in the position marker
  a shape defined by light modules included in the position marker
  a shape defined by an outer border of dark modules of the position marker
  a shape defined by dark modules within the outer border of the position marker
  a color of dark modules that define the position marker
  a color gradient applied to modules included in the position marker
  image(s) or logo(s) displayed within the position marker A position detection pattern may include alignment markers. An alignment marker may include modules arranged in a specific formation. An exemplary alignment marker may include an outer border of 5×5 dark modules surrounding an inner border of 3×3 light modules and a single dark module in the center of the inner border. A location or orientation of the data zone of the QR code may be detected based on detecting one or more alignment markers. For example, an alignment marker may allow a scanning device to locate the data zone despite displacement of the QR code relative to the scanning device, such as when the QR code is bent or curved.

A position detection pattern may include one or more modules that define a timing pattern of the QR code. A timing pattern may include alternating dark and light modules. Timing patterns enable a scanning device to determine dimensions of a single module within the data zone. The arrangement of modules within the timing pattern enable a device scanning the QR code to follow a sequence of the executable instructions encoded in the data zone.

The platform may include a third interface for constructing an environmental zone of the QR code. The environmental zone may include modules that do not include any instructions for the scanning device. An environmental zone may include modules that are not intended to be decoded by a scanning device. An environmental zone may include a buffer of modules that demarcate the data zone within the QR code. The buffer of modules may be light modules. The third user interface may provide functionality for inputting a third set of design choices that will be applied to the environmental zone.

The third interface may construct the environmental zone to enhance readability of the data zone by a scanning device. The third interface may generate an environmental zone that appears, to a human eye, to be a contiguous extension of the data zone. The third interface may generate an environmental zone having a user defined aesthetic appearance. The third interface may generate an environmental zone that includes aspects defined by user design choices and aspects defined by machine generated design choices.

The third interface may allow a user to input design choices for the environmental zone that include non-uniform modules. Non-uniform modules may be different shapes or sizes than those included in the data zone. A scanning device may not be capable of processing the non-uniform modules. However, the non-uniform modules include a desired aesthetic appearance to a human eye. For example, the non-uniform modules may appear to a human eye to be a contiguous extension of modules within the data zone.

The first interface may construct the data zone by adjusting construction of position detection patterns. The first interface may apply machine generated design choices to the data zone. For example, based on user design choices entered for the data zone, the first interface may adjust a layout or design of position detection patterns in the data zone. The first interface may alter a default layout or design of modules within position detection patterns. The first interface may adjust modules generated by the second interface and modules generated by the third interface.

When generating modules within a data zone, the first interface may prioritize readability of the data zone by a scanning device over applying a user's design choices to the data zone exactly as entered by the user. For example, the first interface may ensure the data zone maintains a threshold error correction level or that modules within the data zone are scannable within a target time window.

To maintain a threshold error correction level of the data zone, the first interface may modify the user's design choices entered for modules within a position detection pattern or other modules of the data zone. The first interface may modify the user's design choices for modules within the position detection pattern or other modules of the data zone such that the data zone generated by the first interface maintains an aesthetic appearance associated with the user's design choices.

The software engine may apply computational aesthetic techniques to define an aesthetic appearance associated with the user's design choices. Such computational techniques may include generating mathematical representations of the user's design choices. Such computational techniques may include applying algorithms and statistical models to generate a numerical aesthetic assessment of user entered design choices. Such techniques and models may be specially formulated to adhere to known requirements and standards for QR codes. Illustrative QR code standards may include ISO/IEC 18004:2015 and ISO/IEC 24778:2008.

The computational aesthetic techniques may include applying machine learning algorithms to define an aesthetic appearance. The machine learning algorithms may be applied to user entered design choices and zones of a QR code associated with user entered design choices. Illustrative design choices may include color, luminance, contrast, shape, intensity, edges, and sharpness of modules within a QR code. Based on the user entered design choices, the machine learning algorithms may define how the design choices impact human aesthetic judgment and identify regions of the QR code that may be relatively more or less important for human aesthetic judgment.

Illustrative computational techniques that may be used to define aesthetic appearance may include application of machine learning techniques, such as AdaBoost, Naive Bayes, Support Vector Machine, Random Forests, Artificial Neural Networks and Convolutional Neural Networks. Computational techniques may include applying image clustering unsupervised machine learning to define aesthetic appearance. Illustrative image clustering may include applying K-Means Clustering and Fuzzy Clustering.

Illustrative machine generated changes implemented by the first interface may include altering color design choices entered by the user. Illustrative color design choices that may be altered include hue, tint, shade, tone, saturation, lightness, chromaticity and intensity. Illustrative machine generated changes may include redistributing colors applied to individual modules within a QR code. For example, the first interface may only apply colors entered by the user but may decide how to apply the user entered colors to individual modules within the data zone, position detection patterns or environmental zone.

The first interface may alter a mask pattern applied to modules within a data zone. A mask pattern may be configured to reduce the number of hard-to-read module patterns present in a data zone. In some embodiments, the first interface may construct the data zone by rearranging modules within an environmental zone. The first interface may rearrange modules generated by the third or second interface. Changes applied by the first interface to modules generated by the third or second interfaces may enhance scannability of the data zone.

The second interface may construct a position detection pattern by adjusting a construction (e.g., size, color, shape) of other modules within the data zone or modules within the environmental zone. For example, the second interface may adjust an appearance of modules within the data zone by redistributing a color scheme applied by the first interface to one or more modules within the data zone. The second interface may resize or reposition modules within the data zone.

The third interface may construct the environmental zone by adjusting an appearance of modules within the data zone. The third interface may adjust the data zone by changing a size of modules within the data zone. The third interface may change a size of the modules determined by the first interface. The third interface may change color or shape modules determined by the first interface.

Each of the first, second and third interfaces, when constructing modules within the environmental zone, the data zone or position detection patterns, may maintain fidelity of executable instructions encoded in the data zone. Fidelity may refer to the executable instructions remaining, despite any aesthetic changes, reliably scanned and decoded by a scanning device. For example, the first interface may ensure that the executable instructions encoded in the data zone reliably trigger a target action when scanned regardless of design choices applied to the QR code.

The platform may conduct automated testing of a generated QR code. The automated testing may simulate fidelity of the generated QR code when scanned by different devices using different operating systems. The platform may maintain fidelity of executable instructions encoded in the data zone such that a QR code constructed based on the first, second and third sets of design choices is reliably scanned. Scan reliability may be defined by a data zone that can be read within a threshold time (e.g., 3 seconds) by each of a threshold number of devices. An illustrative threshold number of devices may include one or more devices. The threshold number of devices may include one or more software emulators configured to mimic a scanning device. The illustrative threshold number of devices may include at least one device from two or more manufacturers.

The first, second and third interfaces, collectively may construct a QR code based on the first, second and third design choices such that the generated QR code includes a target error correction level. For example, the first, second and third interfaces, when constructing the environmental zone, the data zone and position detection patterns, may maintain fidelity of executable instructions encoded in the data zone such that the QR code includes error correction code for restoring at least 15% of the executable instructions in the data zone.

The software platform may reject at least one of the first, second and third design choices entered by a user. For example, the software platform may determine that if a QR code was generated based on the entered design choices, the generated QR code would not include a target error correction level. The software platform may be configured to reject such user entered design choices.

The software platform may prompt the user to make changes to user entered design choices. The software platform may suggest alternatives to the user's design choices. The software platform may suggest changes based on defining an aesthetic appearance associated with the user entered design choices. The software platform may generate an illustrative QR code showing the suggested alternatives. The software platform may allow the user to override rejection of design choices. For example, the user may wish to generate a QR code having a desired aesthetic appearance, even though the software platform has determined that the QR code will not include a target error correction level.

The first interface may provide tools for allowing the user to enter a first set of design choices for modules within a data zone. Illustrative design choices for a data zone may include selecting an image embedded in the data zone, a color scheme applied to modules in the data zone, a shape of modules in the data zone and a size of modules in the data zone.

The second interface may provide tools for a user to enter a second set of design choices for a position detection pattern. The position detection pattern may include modules part of the data zone. Illustrative design choices for a position detection pattern may include a color scheme applied to modules that define a marker (e.g., position, alignment, timing marker) within a position detection pattern.

An exemplary color scheme may include a first color applied to modules of the 5×5 outer border of a position marker and a second color applied to modules of the 3×3 inner core of the position marker. A third color or a desired background may be applied to light modules positioned between the outer border and inner core of the position marker. The second interface may construct a position marker such that the color scheme, as applied, maintains a sufficient contrast between the light/dark modules such that each module is registered by a scanning device as a light or dark module, respectively.

The second set of design choices may include a shape of a marker (e.g., position, alignment, timing marker) included in a position detection pattern. For example, the second design choices may include a first shape (e.g., circular) that defines an outer border of a position marker and a second shape (e.g., diamond) that defines the inner core of the position marker. Some embodiments may include substituting a logo for the inner core.

Methods for generating a quick-response ("QR") code are provided. Methods may include providing a default QR code. The default QR code may include a data zone. The data zone may include modules that encode executable instructions for triggering a target action when the default QR code is scanned. The data zone may include a position detection pattern, a timing pattern and an alignment pattern. Modules within the data zone may include dark and light modules.

Methods may include receiving a first set of design choices for the data zone. Methods may include adjusting the default QR code such that the data zone conforms to the first set of design choices. Methods may include applying the first set of design choices to the data zone such that, after application of the first set of inputs, a resultant QR code will trigger the target action when scanned.

Methods may include receiving a second set of design choices for a position detection pattern. The position detection pattern may include at least one position marker. The position detection pattern may include buffer modules. The buffer modules may form a separator pattern that includes light modules separating an outer border of the position marker from other modules. The buffer modules may form a separator pattern that includes light modules separating modules in the data zone from modules in an environmental zone.

Methods may include applying the second set of design choices to the position detection pattern. Methods may include adjusting a configuration of the default QR code such that a resultant QR code conforms to the first and second sets of design choices and the data zone triggers the target action when scanned.

Methods may include receiving a third set of design choices for modules within an environmental zone. Methods may include adjusting the default QR code such that a resultant QR code conforms to the first, second and third sets of design choices and the data zone triggers the target action when scanned.

Adjusting the default QR code may include redistributing a color scheme applied to modules within a data zone of the default QR code. Adjusting the default QR code may include generating a new arrangement of modules for the environmental zone of the default QR code. The new arrangement may include determining whether each module within the environmental zone should be light or dark.

Methods may include adjusting the default QR code such that a resultant QR code conforms to the first, second and third sets of user entered design choices and the data zone includes error correction code that restores at least 15% of instructions encoded in the data zone. Methods may include rejecting one or more of the first, second and third sets of user entered design choices. User entered design choices may be rejected when, after adjusting the default QR code, a resultant QR code will not include a target error correction level or threshold level of scan reliability.

An artificial intelligence ("AI") engine for generating a quick response ("QR") code is provided. The AI engine may generate the QR code based on a set of design choices. The design choices may be entered by a user. The AI engine may apply a first member of the set of design choices to a default QR code and generate an interim QR code. The AI engine may apply a second member of the set of design choices to the interim QR code and generate a resultant QR code. The resultant QR code may include error correction code for restoring information encoded in a threshold percentage of modules included in a data zone of the default QR code.

The AI engine may be configured to apply the set of design choices such that a pattern of modules defining the data zone of the default, interim and resultant QR codes all trigger the same target action when scanned. Generating the resultant QR code may include altering at least one member of the set of the design choices such that the resultant QR code includes a different arrangement of modules than the interim QR code and a different arrangement of modules than the default QR code.

An arrangement of modules may differ based on a position of dark or light modules. An arrangement of modules may differ based on sizes, color or other attributes of modules. For example, the AI engine may generate the resultant QR code by altering a color distribution scheme applied to the interim QR code. Altering the color distribution scheme may include adding color to one or more modules. The altering of the color distribution scheme may include changing a color applied to a module. A module may be processed as a light or dark module by a scanning device before and after altering the color scheme.

The AI engine may be configured to generate the resultant QR code by altering modules within an environmental zone of the interim QR code. Altering modules within the environmental zone may include changing one or more modules from dark to light. Altering modules within the environmental zone may include changing one or more modules from light to dark.

The AI engine may control generation of the interim and resultant QR codes such that the interim and resultant QR codes, when scanned, each trigger the identical target action. The default QR code may also trigger the target action when scanned. The AI engine may test generated QR codes to ensure that the data zone is reliably scannable.

The AI engine may apply one or more aesthetic computational techniques to define an aesthetic appearance associated with the user's design choices. The AI engine may alter the literal user entered design choices to generate a resultant QR code that includes the defined aesthetic user appearance and includes a target error correction level and threshold level of scan reliability.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative machine-readable optical label 100. Label 100 may be generated using apparatus and methods described therein. Label 100 includes data zone 101. Data zone 101 includes light and dark modules that encode executable instructions. Label 100 includes alignment marker 103. Alignment marker 103 is defined by an outer border that includes light and dark modules, an inner border of light modules and a dark module in the center.

Label 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules.

Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

Label 100 includes environmental zone 113. Environmental zone 113 includes modules that are not interpreted when label 100 is scanned. Environmental zone 113 may include all parts of label 100 outside of data zone 101. Environmental zone 113 has been constructed such that it has an appearance that, to a human eye, seems contiguous with data zone 101. Environmental zone 113 may be constructed such that it does not interfere with the scanning of data zone 101. For example, apparatus and methods described herein may adjust an arrangement of modules within environmental zone 113 to ensure that the modules of environmental zone 113 do not interfere with a scanning of data zone 101.

Environmental zone 113 includes buffer 111. Buffer 111 are light modules that space data zone 101 apart from modules of environmental zone 113. Apparatus and methods described herein may adjust a width of buffer 111 to ensure that environmental zone 113 does not interfere with a scanning of data zone 101. Apparatus and methods described herein may adjust a width of buffer 111 to ensure that environmental zone 113 does not interfere with a scanning of data zone 101 and environmental zone 113 has an appearance that, to a human eye, seems contiguous with data zone 101.

Label 100 includes circular perimeter 107. Perimeter 107 may be included in environmental zone 113. Apparatus and methods described herein may adjust a line thickness, shape, color or any other suitable design choice of perimeter 107. Apparatus and methods described herein may ensure that perimeter 107 does not interfere with a scanning of data zone 101. Apparatus and methods described herein may arrange modules of environmental zone 113 within a space between data zone 101 and perimeter 107.

Figure 2:
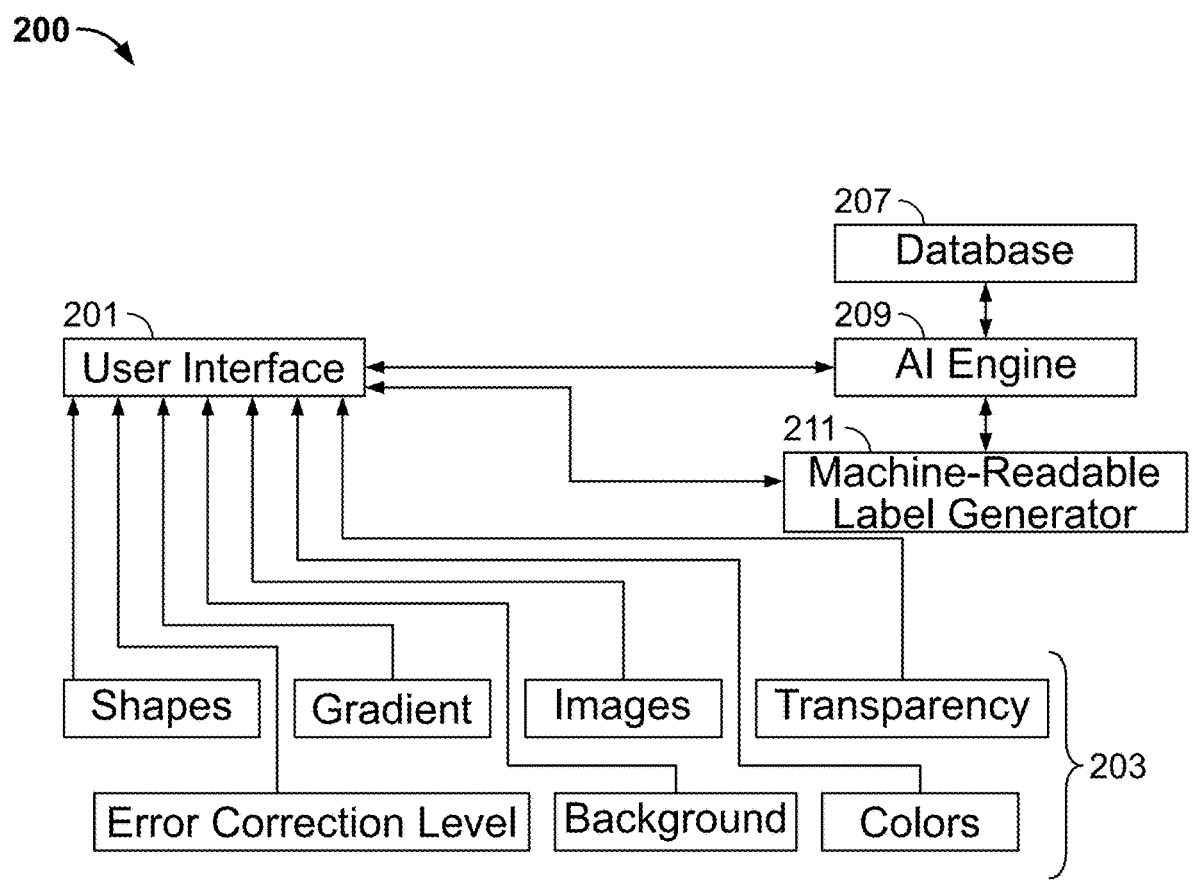
FIG. 2 shows an illustrative system in accordance with principles of the disclosure.

FIG. 2 shows illustrative system 200. System 200 includes components 201, 203, 207, 209 and 211. Components of system 200 may include a processor circuit. The processor circuit may control overall operation of system 200 or one or more of components 201, 203, 207, 209 and 211. The processor circuit may include hardware, such as one or more integrated circuits that form a chipset. The hardware may include digital or analog logic circuitry configured to perform any suitable (e.g., logical) operation.

Each component may include input/output ("I/O") circuitry, which may include a transmitter device and a receiver device and may interface with fiber optic cable, coaxial cable, telephone lines, wireless devices, physical network layer hardware, a keypad/display control device or any other suitable encoded media or devices. Each component may include peripheral devices, which may include counter timers, real-time timers, power-on reset generators or any other suitable peripheral devices.

Each component may include a machine-readable memory. Machine-readable memory may be configured to store, in machine-readable data structures, instructions for: triggering a target action when label 100 is scanned, formulating an arrangement of dark/light modules, translating user design choices into an arrangement of dark/light modules, or any other suitable functionality.

Components of system 200 and their respective sub-components may be linked by a system bus, wirelessly or by other suitable interconnections. Components may include RAM, ROM, an I/O module and a non-transitory or non-volatile memory. The I/O module may include a microphone, button and/or touch screen which may accept user-provided input. The I/O module may include a speaker for providing audio output and a video display for providing textual, audiovisual and/or graphical output.

Software applications may be stored within the non-transitory memory and/or other storage medium. Software applications may provide instructions to the processor circuit that enable components to perform various functions. For example, the non-transitory memory may store software applications such as an operating system, application programs, and an associated database. Some or all of computer executable instructions of the components may be embodied in hardware or firmware. The hardware and firmware may include one or more circuit boards. In some embodiments, the circuit boards may be integrated into a single chip. The chip may be silicon-based.

Components of system 200 may include cloud computing and virtualization implementations of software. Such implementations may be designed to run on a physical apparatus supplied externally by a hosting provider, a client, or other virtualized platform. Components may be operational with distributed computing environments where tasks are performed by remote processing devices that are linked through a communications network. In a distributed computing environment, program modules may be located in both local and remote computer storage media including memory storage devices. Components may rely on a network of remote servers hosted on the Internet to store, manage, and process data (e.g., "cloud computing" and/or "fog computing").

Software application programs, which may be used by components of system 200, may include computer executable instructions for invoking user functionality related to communication, such as email, short message service ("SMS"), and voice input and speech recognition applications. Software application programs may utilize one or more algorithms that generate QR codes based on design choices entered by a user or any other suitable tasks.

Components of system 200 may support establishing network connections to one or more remote computers or networks. Each component of system 200 may be a node on a network. Illustrative network connections may include a local area network ("LAN") and a wide area network ("WAN"), and may also include other networks. When used in a LAN networking environment, components may be connected to each other on the LAN through a network interface or adapter. Each component may include a communication circuit. The communication circuit may include a network interface card or adapter.

When used in a WAN networking environment, components may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and components may be operated in a client-server configuration to permit a user to retrieve web pages from a web-based server. Web browsers can be used to display and manipulate data on web pages.

Components of system 200 may be portable devices such as a laptop, tablet, smartphone, other "smart" devices or any other suitable device for receiving, storing, transmitting and/or displaying electronic information. Components of system 200 may include, and may be operational with, numerous other general purpose or special purpose computing system environments or configurations. Examples of computing systems, environments, and/or configurations that may be suitable for use with this disclosure include, but are not limited to, personal computers, server computers, handheld or laptop devices, tablets, "smart" devices, mobile phones, multiprocessor systems, microcomputers, minicomputers, mainframe computers, distributed computing environments that include any of the above systems or devices, and the like.

Components of system 200 may be produced by different manufacturers. Components of system 200 may capture and process data in different formats. For example, components may use different data structures to store captured data. Components of system 200 may utilize different communication protocols to transmit captured data or communicate with other systems. Despite such operational differences, components of system 200 may be configured to operate substantially seamlessly. Interoperability may allow a user to enter design choices using a first system, utilize a software engine running on a second system to generate an arrangement of modules that implement the design choices and display a QR code generated based on the arrangement of modules on a third system.

Components of system 200 include user interface ("UI") 201. UI 201 may allow a user to enter design choices for constructing a machine-readable optical label such as a QR code. UI 201 may provide software tools for a user to enter illustrative design choices 203. UI 201 may interact with AI engine 209. AI engine 209 may determine an arrangement of modules that generates a QR code in accordance with design choices 203 received from UI 201. AI engine 209 may store the determined arrangement of modules in database 207.

AI engine 209 may utilize QR code generator 211 to construct a QR code in accordance with the determined arrangement of modules. In some embodiments, AI engine 209 may adjust an arrangement of modules each time a user enters one or more of design choices 203. AI engine 209 may utilize QR code generator 211 to generate and display a QR code that includes each of design choices 203 entered by a user. AI engine 209 and QR code generator 211 may be included in a software engine.

Figure 3:
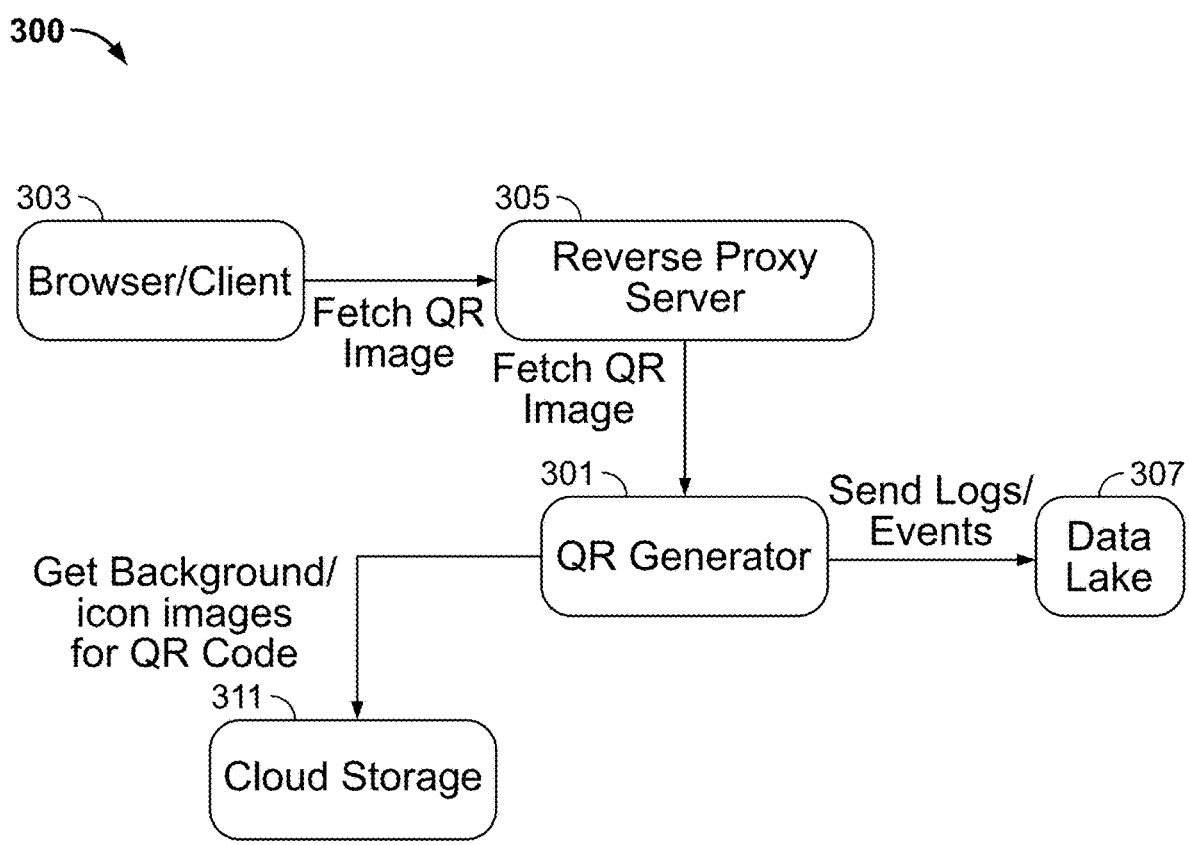
FIG. 3 shows an illustrative system in accordance with principles of the disclosure.

FIG. 3 shows illustrative system 300. System 300 includes components 301-311. Each component of system 300 may include one or more features of components described in connection with system 200.

System 300 shows illustrative components for implementing an application program interface ("API") for server-side rendering of machine-readable optical labels such as QR codes. The API may allow users to embed QR codes in a webpage. The API may allow graphics software to access QR generator 301. For example, using the API, user may draw or create an image or other artistic work using graphics software. The API may allow the user to submit the artistic work to QR generator 301, which will generate a QR code based on the artistic work. QR generator 301 may be included in a software engine.

The API may allow users to batch jobs submitted to QR generator 301. For example, the API may allow a user to submit a plurality of artistic works to QR generator 301. QR generator 301 will then generate a QR code for each artistic work. In some embodiments, system 300 may not provide server-side storage of QR code images. The API may return a generated QR code image to the requesting user or application for storage.

Reverse proxy server 305 may be deployed in front of a QR generator. Reverse proxy server 305 may access QR generator 301 on behalf of a requesting user or graphics software. Reverse proxy server 305 may return a QR code image produced by QR generator 301 to the requesting user or application as if the user or application is interacting directly with QR generator 301. However, reverse proxy server 305 may be the only system that interacts directly with QR generator 301. Utilizing reverse proxy server 305 may provide load balancing and security that ensures consistent access to QR generator 301.

System 300 may support two API input types. A first API input type may include settings/attributes associated with a QR code. User entered design choices may be illustrative setting/attributes. The API may submit the setting/attributes to QR generator 301 via reverse proxy server 305. QR generator 301 may return, to the requesting user/application, a QR code image generated based on the setting/attributes. The first API input type, QR generator 301 may utilize the settings/attributes to generate a QR code image without any looking up any additional information in database 311. This first API input type may be useful in connection with providing enterprise level functionality. By avoiding the database lookup, this first API input type minimizes latency between a time the user submits a request for a QR code image and a time the generated QR code image is returned to the user.

A second API input type may accept a pointer to a memory or record location. The second API input type may require looking up settings/attributes stored in a database (e.g., database 311) at the memory or record location. Setting/attributes retrieved from the database may then be submitted to QR generator 301 to generate a QR code image. The generated QR code image is then returned to the requesting user/application. A user interface, such as UI interface, such as UI 201 may store common background and icon images in an associated database.

QR generator 301 may generate a QR code image. The generated image may be returned to a requesting user/application. Generate the QR code image may include image rendering or other digital image processing. For example, QR generator 301 may include any suitable rendering software such as kjua, imagmagick or libvips libraries. In some embodiments, a background image included in a QR code may be generated outside of QR generator 301. In some embodiments, icon images included in a QR code may be generated by QR Generator 301.

System 300 includes browser/client 303. Browser/client 303 may accept one or both of the two API input types described above. QR generator 301 may include AI engine 209. The AI engine 209 may apply machine-generated changes to design choices received from browser/client 303. AI engine 209 may test a QR code image generated by QR generator 301 to ensure that the QR code image is reliably scannable. AI engine 209 may apply machine-generated changes to design choices received from browser/client 303 to enhance scan-ability, error correction, aesthetics or any other suitable attribute of a generated QR code image.

For security, system 300 may include reverse proxy server 305 that controls access to QR code generator 301. Reverse proxy server 305 may retrieve images requested by browser/client 303. Reverse proxy server 305 may provide the requested images to QR code generator 301. Using the received images, QR generator 301 may incorporate background or icons needed to construct a QR code in accordance with user design choices.

Background images or icons may be stored in a cloud storage platform or any other suitable database 311. Logs and events triggered when generating a QR code may be stored in data lake 307.

Figure 4:
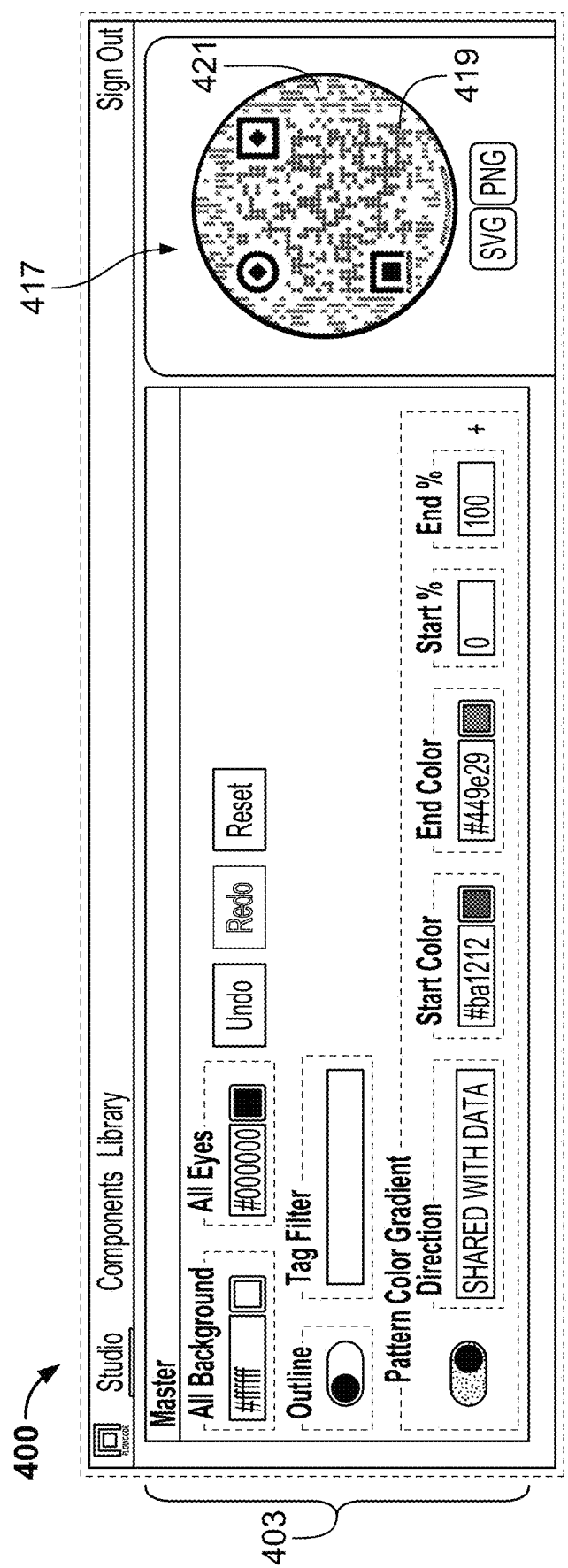
FIG. 4 shows an illustrative view of a user interface in accordance with principles of the disclosure.

FIG. 4 shows view 400 of an illustrative user interface and associated software tools 403 for entering default design choices associated with QR code 417. Design choices entered using tools 403 may be overridden by design choices entered for specific zones of the QR code using software tools shown in FIGS. 4-7D. In some embodiments, design choices entered using tools 403 may override or prevent the user from changing those design choices using software tools shown in FIGS. 5-7D.

View 400 shows QR code 417 that has been generated based design choices entered using tools 403. For example, tools 403 shows that the user has applied a color gradient that blends a first color applied to modules within data zone 419 into a second color applied to modules within environmental zone 421. If a user were to change design choices, a software engine including AI engine 209 and QR generator 211 would dynamically update QR code 417 to include those changes.

View 400 shows that tools 403 include directional pathways for applying a color gradient. In view 400, the user has selected a color gradient that blends colors of modules in data zone 419 (red start color #ba1212) into a color of modules in environmental zone 421 (green end color #449e29. The directional pathway for the color gradient applied to QR code 417 is from a center of data zone 419 to an outer perimeter of environmental zone 421.

Figure 5A:
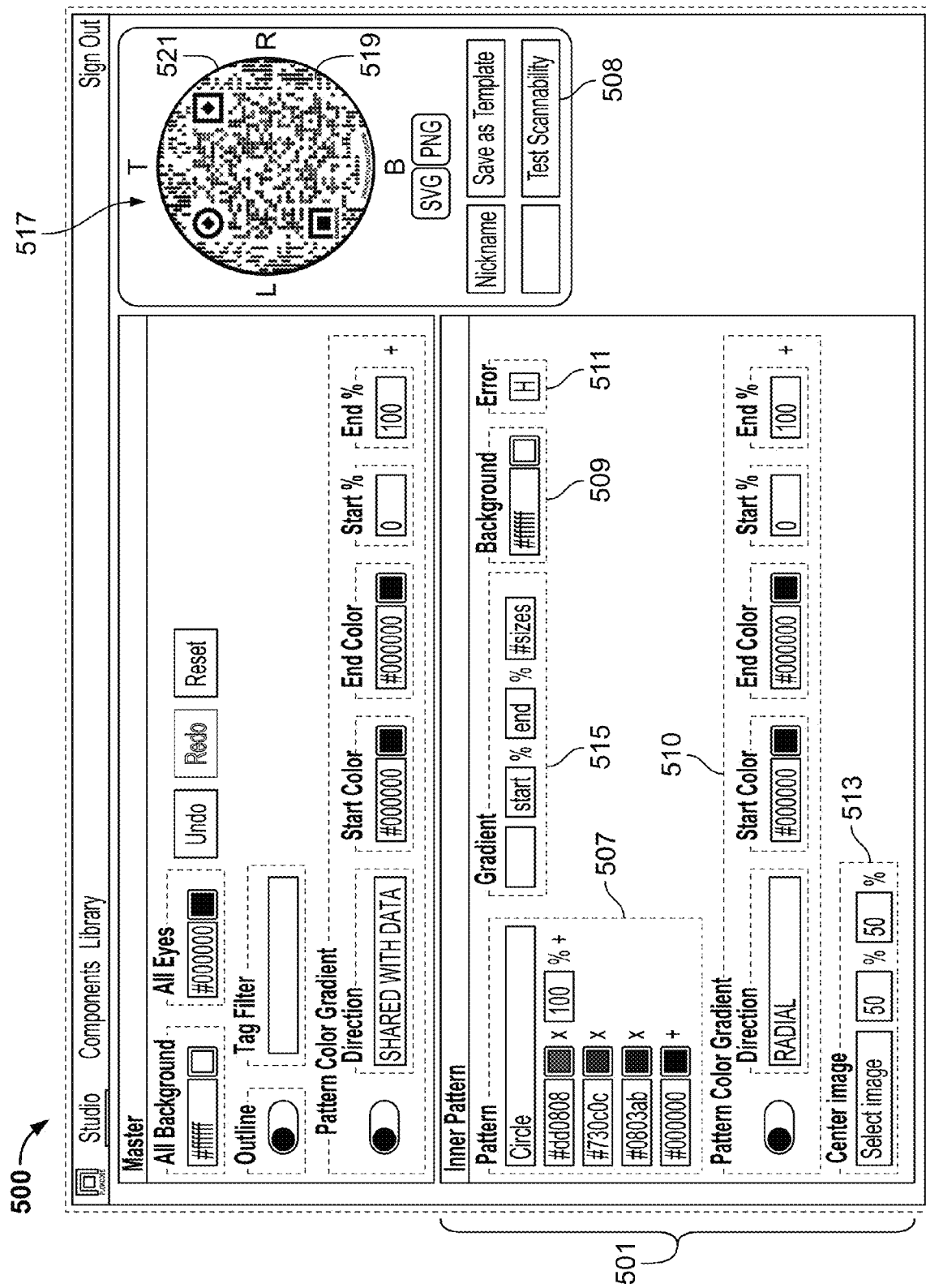
FIGS. 5A-5C show illustrative views of user interfaces in accordance with principles of the disclosure.

FIG. 5A shows illustrative view 500. View 500 provides a user interface and associated software tools 501 for a user to enter design choices associated with a data zone 519 of QR code 517. Tools 501 allows a user to specify design choices for modules within data zone 519.

Options 507 show that a user has entered circular-shaped modules for data zone 519. Options 507 show the user has applied four different colors to modules in data zone 519. AI engine 209 may determine how to distribute the four user entered colors among modules within data zone 519. Option 509 shows a user has entered a "white" background for data zone 519.

Option 511 shows the user has selected Level H error correction for QR code 517. Level H error correction may correspond allow for restoration of 30% of data bytes included in data zone 519. AI engine 209 may determine how to arrange modules within data zone 519 to implement the selected error correction level.

Options 513 allow the user to enter design choices for selecting and resizing an image that may be embedded in data zone 519. Options 515 allow the user to apply a gradient to a size of modules within data zone 519. An entered size gradient may increase or decrease a size of modules moving from one side of the data zone to another side of data zone 519. An entered size gradient may increase or decrease a size of modules moving from outside data zone 519 to inside data zone 519. An entered size gradient may change a size of modules moving along any suitable directional pathway within data zone 519.

Options 510 allow the user to apply a color gradient to modules within data zone 519. A color gradient may allow the user to blend one color into another (e.g., colors selected using options 507) such that one color gradually fades and changes to the other color. The user may also specify a direction or path for applying the color gradient.

For example, a color gradient may be applied moving from outer perimeter 521 toward a center of data zone 519. The color gradient may be applied in a radially or swirling direction. For example, the direction of the color gradient may follow a circular pathway defined by outer perimeter 521. The color gradient may be applied from right side R of data zone 519 to left side L of data zone 519. The color gradient may be applied from top T of data zone 519 to bottom B of data zone 519. A color gradient may be applied across data zone 519 along any suitable direction or non-linear pathway.

A software engine (e.g., including AI engine 209 and QR generator 211) may ensure that a generated machine-readable label that includes unique aesthetic design choice entered by a user using software tools 501 is reliably scannable. The software engine may change design choices entered by the user to ensure that generated machine-readable label is reliably scannable. The software engine may apply computational aesthetic techniques to define an aesthetic appearance associated with user entered design choices. The software engine may utilize artificial intelligence and machine learning techniques to create a reliably scannable machine-readable label that adheres to the computed aesthetic appearance associated with user entered design choices. A user may manually trigger testing of the scannability of QR code 517 using option 508.

Figure 5B:
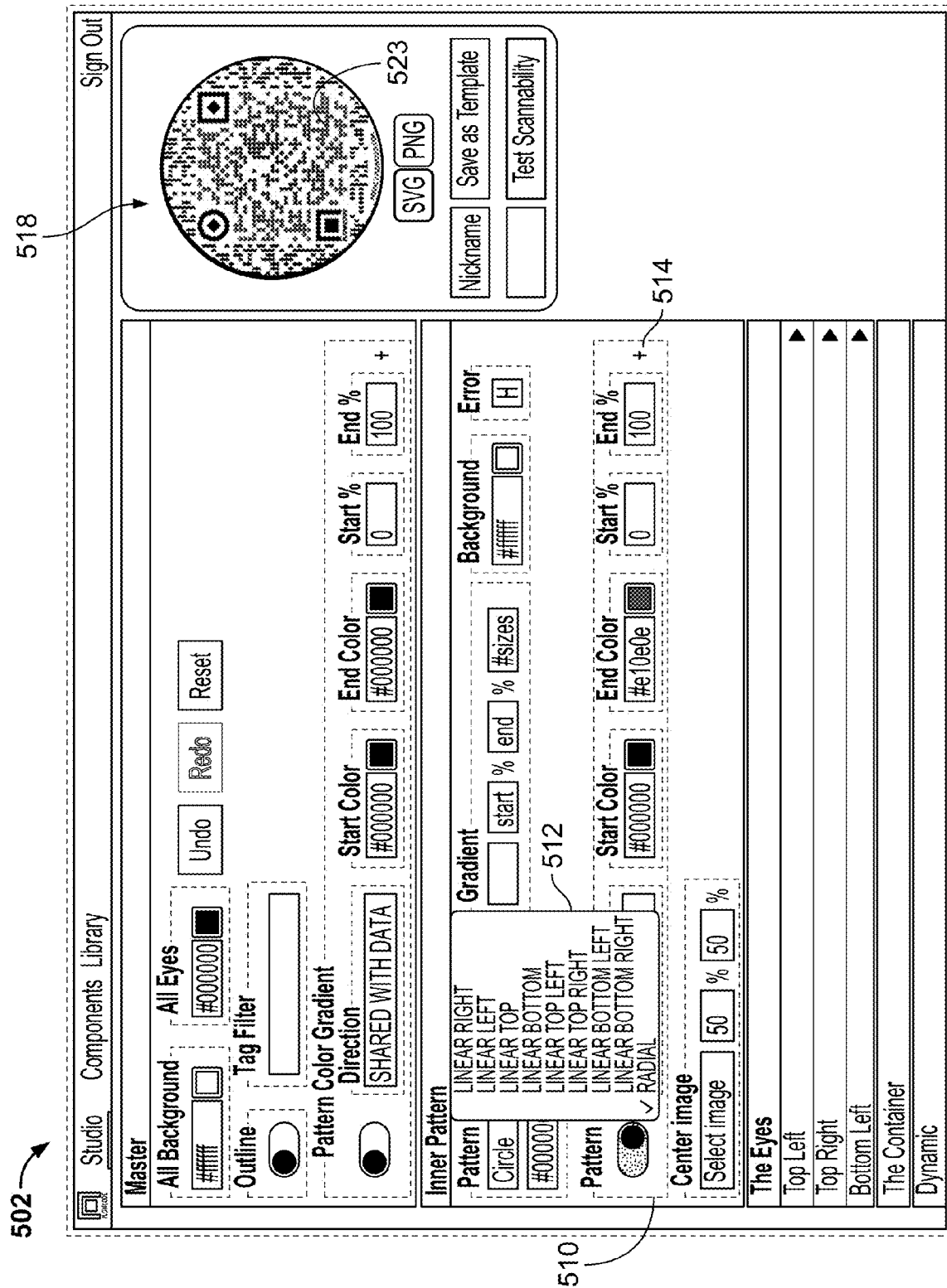

FIG. 5B shows illustrative view 502 of a user interface and associated software tools for a user to enter design choices 512 in connection with options 510. Design choices 512 include directional pathways for applying a color gradient. FIG. 5B shows that a radial directional pathway has been entered. QR code 518 shows that modules in data zone 523 are color #000000 (black) at a center of data zone 523 and gradually change to color #e10e0e (orange) at an outer periphery of data zone 523.

Options 510 include design choice 514. Design choice 514 allows a user to enter additional colors that will be mixed with the start and end colors and applied to modules in data zone 523 along the selected directional pathway. If a user were to change design choices associated with options 510, a software engine would dynamically update QR code 518 to include those changes within data zone 523.

Figure 5C:
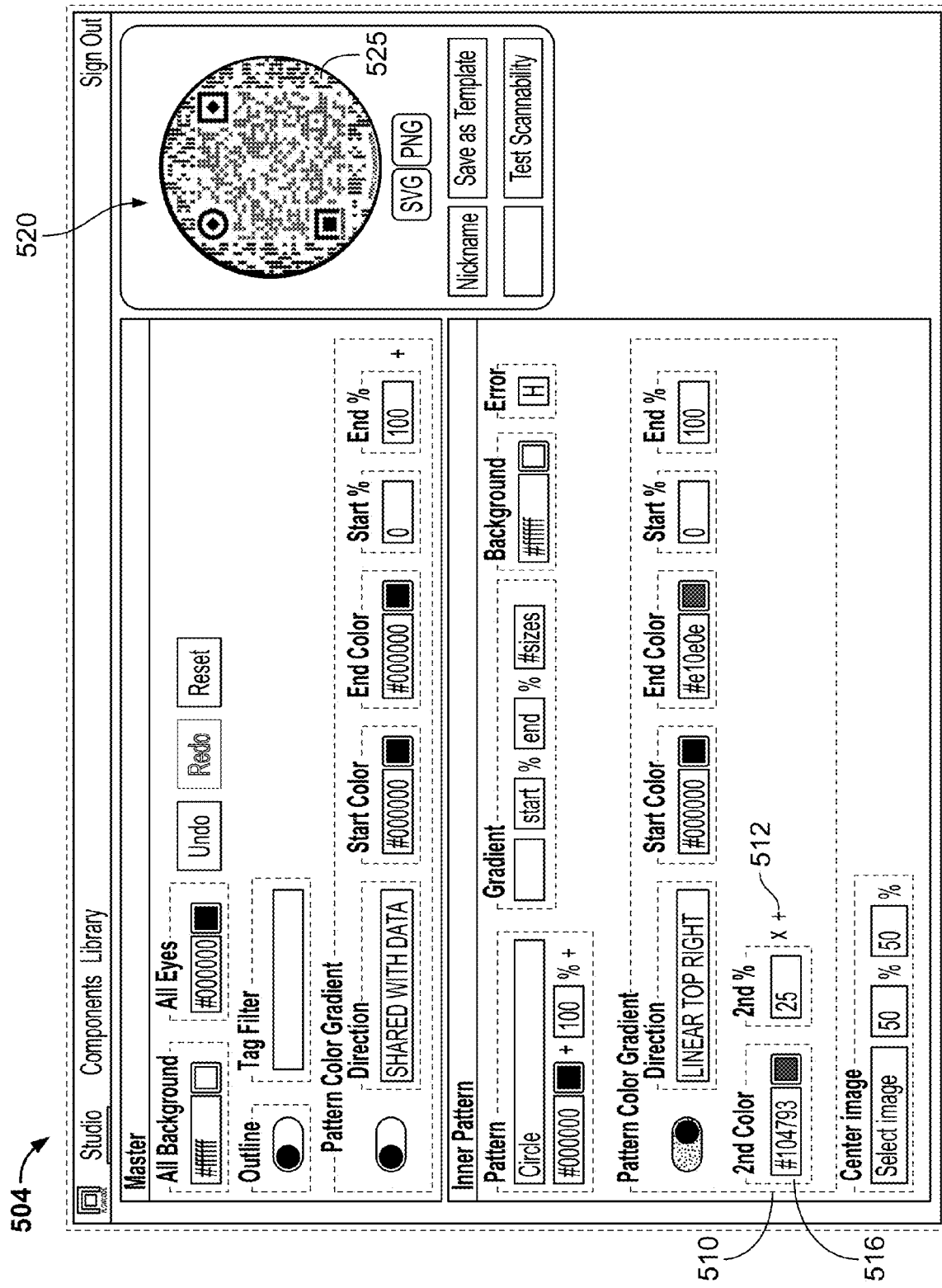

FIG. 5C shows, illustrative view 504 of a user interface and associated software tools for a user to enter design choices for generating QR code 520. View 504 shows that using option 516, a user has entered additional color #104793 that will be mixed with start color #000000 and end color #e10e0e along the entered directional pathway. FIG. 5C shows that user has entered LINEAR TOP RIGHT as the directional pathway for the color gradient. QR code 520 shows that modules in data zone 525 are a blend of colors #000000+#104793 at top right corner of data zone 525 and gradually change to a blend of colors #e10e0e+#104793 at bottom left corner of data zone 523.

Figure 6A:
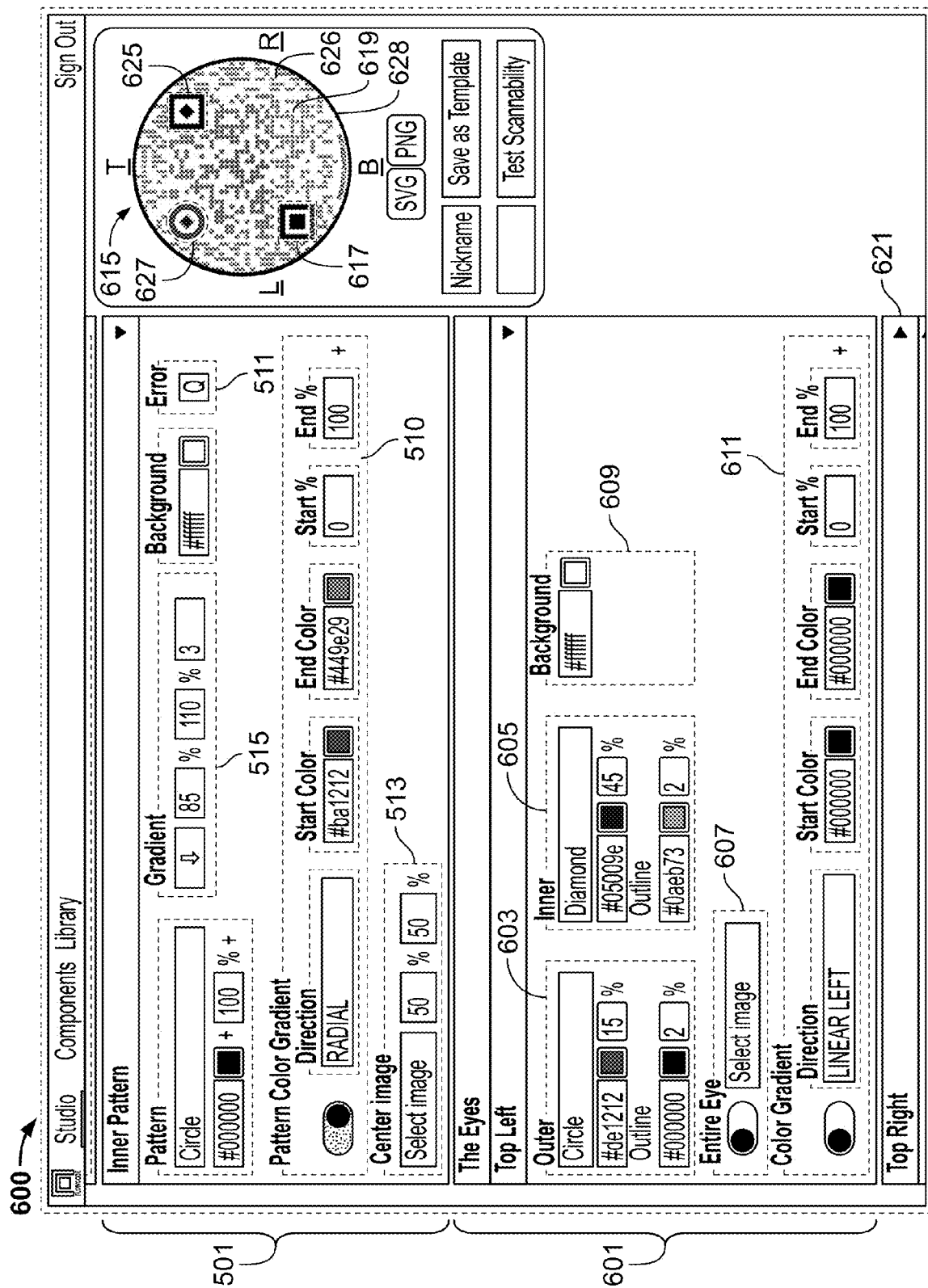
FIGS. 6A-6B show illustrative views of user interfaces in accordance with principles of the disclosure.

FIG. 6A shows illustrative view 600 showing an illustrative user interface and associated software tools 601 and 501 (also shown in FIG. 5A). View 600 shows user entered design choices for software tools 501 that are different from user entered design choices shown in view 500 of FIG. 5A. For example, view 600 shows that the user has entered values for a size gradient into options 515. View 600 shows that the user has utilized the software tools to change a size of modules in data zone 619. The user has selected a "top to bottom" gradient and entered values for modules closer to top T of QR code 615 to be larger than modules closer to bottom B. Options 515 may allow the user to vary modules sizes along any suitable directional pathways.

View 600 shows that in option 511, the user has instructed the software tools to apply Level Q error correction for QR code 615. Level Q error correction may correspond allow for restoration of 25% of data bytes included in data zone 619. AI engine 209 may determine how to arrange modules within data zone 619 to implement the user entered error correction level for the user entered design choices shown in view 600.

View 600 shows that QR code 615 includes position markers ("eyes") 625, 627 and 617. View 600 also shows an illustrative user interface and associated software tools 601 for a user to enter design choices associated with position marker 627 of QR code 615. View 600 shows available software tools 621 (collapsed) for entering design choices for position marker 625. Likewise, software tools for entering design choices for position marker 617 may also be available.

Software tools 601 include options 603 that provide design choices for an outer border of position marker 627. Options 603 shows that a user has entered a circle outer border in color #de1212 (red) framed by outline color #000000 (black). Options 605 provide design choices for an inner core of position marker 627. View 600 shows the user has selected a diamond shape, in color #05009e (blue) framed by outline color #0aeb73 (green).

Percentage values ("%") shown in connection with design choices may represent changes in a size of a feature (e.g., position marker) of the QR code relative to size of the feature defined in a standard (e.g., ISO standards) for the machine-readable label. Software tools disclosed herein may allow a user to enter design choices that alter an aesthetic appearance of a machine-readable label such that modules included in a generated label deviate from a standardized definition for the modules. Such alterations may include changes in size, color and orientation of modules. The alteration may allow a user to create machine-readable labels having unique aesthetic appearance.

The software engine disclosed herein may ensure that despite the unique aesthetic design choices entered by a user, the generated machine-readable label is reliably scannable. The software engine may alter design choices entered by the user to ensure that generated machine-readable label is reliably scannable. The software engine may apply computational aesthetic techniques to define an aesthetic appearance associated with the user's design choices. The software engine may utilize artificial intelligence and machine learning techniques to create a reliably scannable machine-readable label that adheres to the computed aesthetic appearance associated with the user's design choices.

Option 609 provides design choices for a background color of position marker 627. The background ground color may be applied to light modules positioned between the outer border and inner core of position marker 627. A software engine may utilize artificial intelligence and machine learning techniques to ensure that the background color entered by the user does not interfere with the readability of position marker 627 by a scanning device.

Option 607 may be used to may replace position marker 627 with a desired image. For example, in QR code 615, position marker 617 has been replaced by a FLOWCODE logo. Options 611 may apply an entered color gradient to modules within position marker 627. The entered color gradient may blend selected colors in a direction specified by options 611. If a user were to change any of the design choices entered using tools 601, software tool 601 would dynamically update QR code 615 to include the changes within position marker 627.

QR code 615 shows that a color gradient has been applied from a center of data zone 619, outward to environmental zone 626. The applied color gradient blends a color (red) of modules closer to a center of data zone 619 (e.g., entered using software tools shown in FIG. 5A) into a color (green) of modules of environmental zone 626 closer to circular perimeter 628 of QR code 615.

Figure 6B:
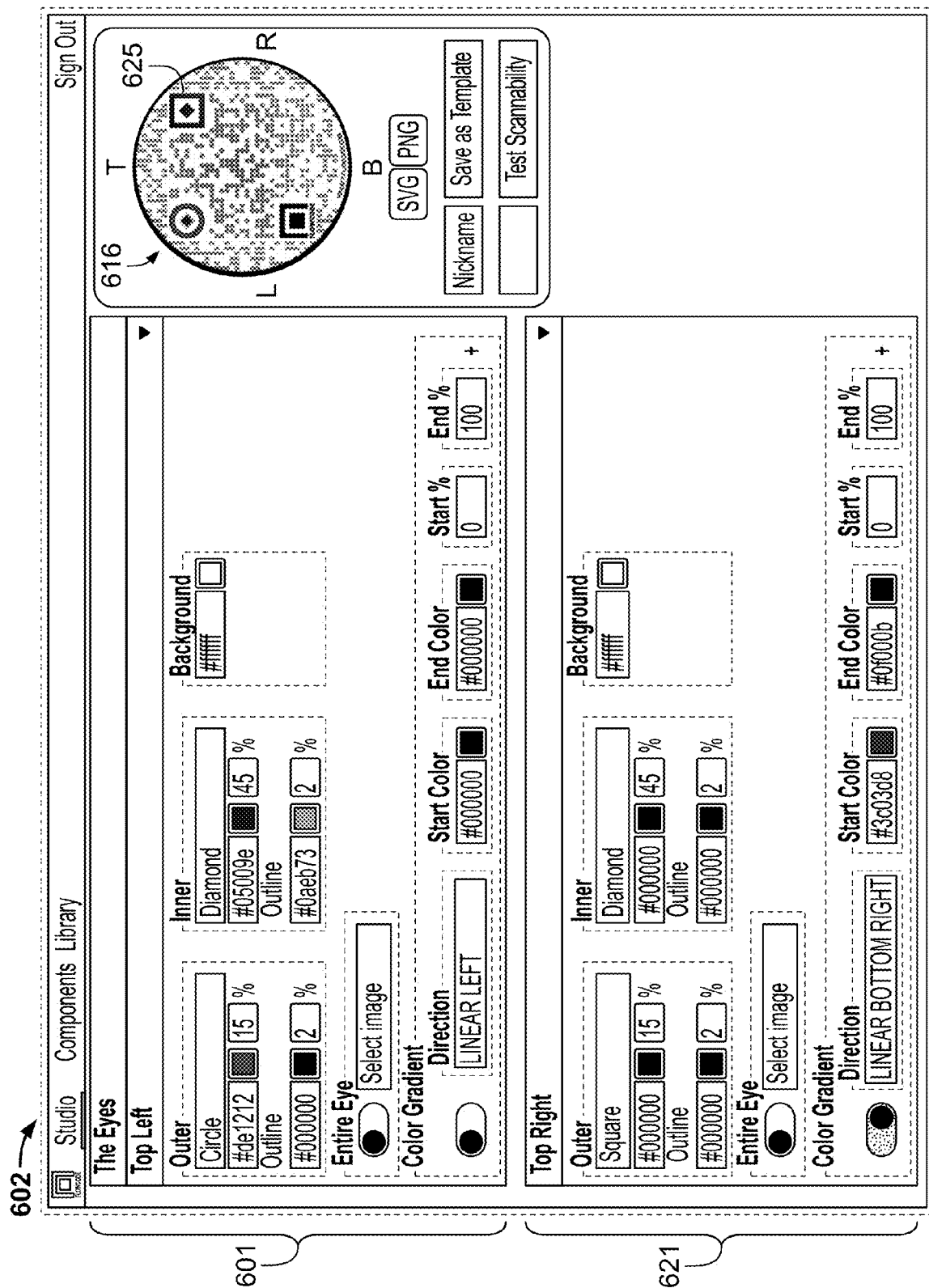

FIG. 6B shows view 602 of illustrative user interface and associated software tools 621 for a user to enter design choices associated with position marker 625 of QR code 616. Software tools 621 may include one or more features of software tools 601 (shown in FIG. 6A). View 602 shows that a user has entered a color gradient that is applied to position marker 625. The color gradient includes starting color #3c03 dB (blue) and end color #0f00b (black). The applied color gradient blends the start color into the end color along a directional pathway that runs linearly from a bottom-right corner of position marker 625 to a top-left corner of position marker 625. For example, the center diamond of position marker 625 is partially blue and partially black.

AI engine 209 may determine how to arrange modules within QR code 616 to implement design choices entered using tools 601 and 621. AI engine 209 may determine the arrangement of modules that does not interfere with reliable scanning of the data zone of QR code 616.

Figure 7A:
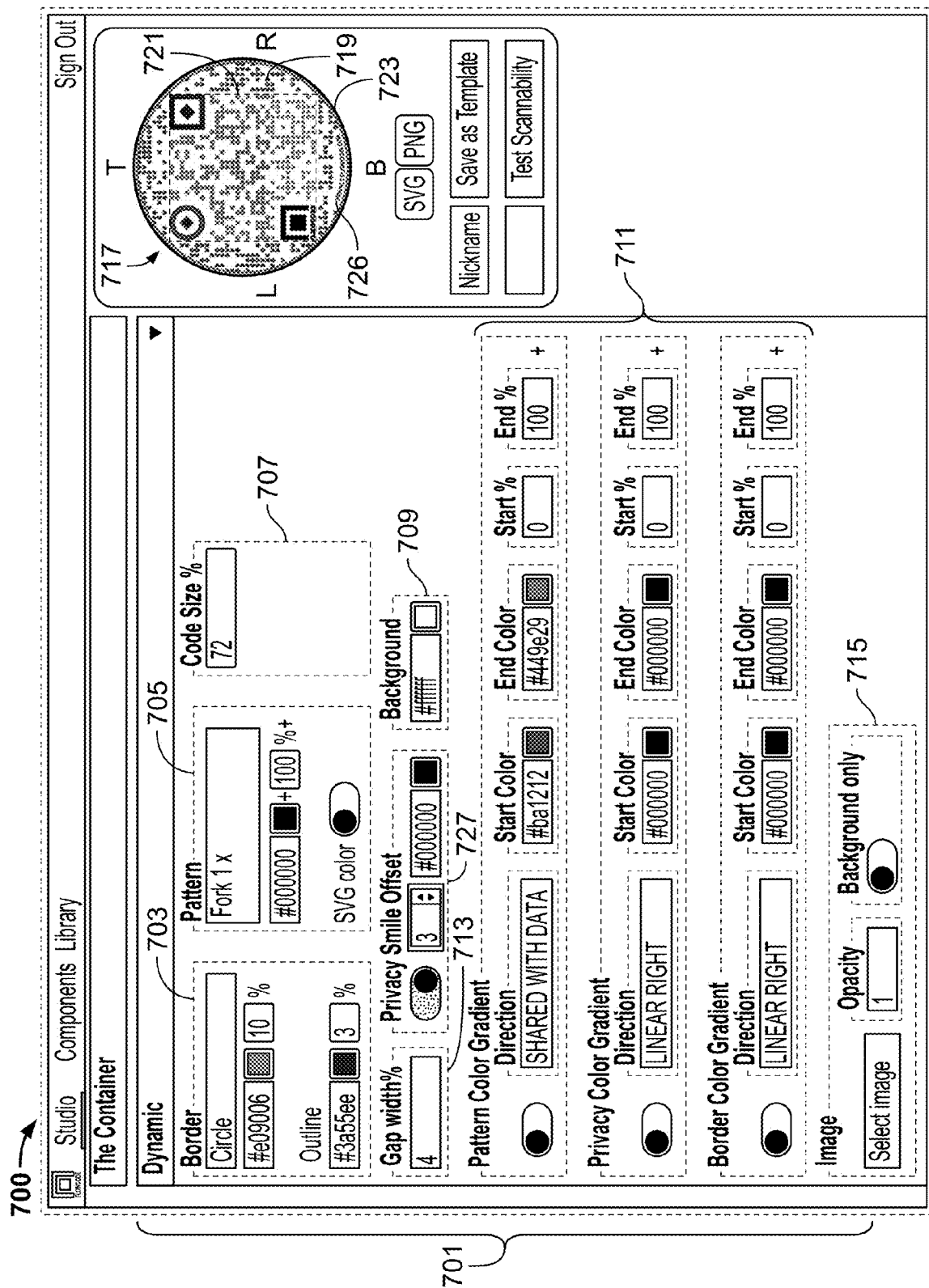
FIGS. 7A-7D show illustrative views of user interfaces in accordance with principles of the disclosure.

FIG. 7A shows illustrative view 700 of illustrative user interface and associated software tools 701 for a user to enter design choices associated with environmental zone 719 of QR code 717. Environmental zone 719 is positioned between data zone 721 and outer perimeter 723. Environmental zone 719 may include outer perimeter 723.

Options 703 provide design choices for outer perimeter 723 of QR code 717. Options 703 allow the user to select a desired shape of an outer perimeter for a QR code. View 700 shows that the user has selected circular outer perimeter 723. Based on a selected outer perimeter, AI engine 209 may determine an arrangement of modules that fill a space between circular outer perimeter 723 and data zone 721. AI engine 209 may determine the arrangement of modules such that environmental zone 719 does not interfere with reliable scanning of data zone 721. AI engine 209 may also determine the arrangement of modules within environmental zone 719 such that environmental zone 719 appears aesthetically to be a contiguous extension of data zone 721.

Options 703 shows that for circular perimeter 723 a user has entered fill color #e09006 (orange) framed by outline color #3a55ee (blue). Options 705 provide design choices for shape and color of modules within environmental zone 719. View 700 shows that the user has selected "Fork 1" shaped modules, which are depicted within environmental zone 719. Options 705 also show that the user may select to generate QR code 717 in SVG or PNG image formats. SVG is an image format designed for two-dimensional vector and vector-raster graphics. PNG is a raster image format typically used in connection full-color images (e.g., photos). In some embodiments, color or size gradients may not be adjustable using software tools 701 for modules or other images in PNG format. In some embodiments, color or size gradients may be adjustable using software tools 701 for modules or other images in SVG format.

Option 707 provides design choices for code size percentage. View 700 shows that the user has selected a percentage value of 72%. Code size percentage may represent a change in a size of a modules of QR code 717 relative to size of modules defined in a standard (e.g., ISO standards) for a particular machine-readable label. Option 713 allows a user to enter a gap width percentage which defines width of a buffer separating data zone 721 from environmental zone 719. Gap width percentage may represent a change relative to a buffer width defined in a standard (e.g., ISO standards) for a particular machine-readable label.

Software tools disclosed herein may allow a user to enter design choices that alter features of a machine-readable label such that the features deviate from a standardized definition of the feature. Such alterations may include changes in size, color and orientation of a feature. The alteration may allow a user to create machine-readable labels having a unique aesthetic appearance based on user-entered design choices.

A software engine may ensure that despite the unique aesthetic appearance, a generated machine-readable label is reliably scannable. The software engine may change design choices entered by the user to ensure that generated machine-readable label is reliably scannable. The software engine may apply computational aesthetic techniques to define an aesthetic appearance associated with the user's design choices. The software engine may utilize artificial intelligence and machine learning techniques to create a reliably scannable machine-readable label that adheres to the computed aesthetic appearance associated with the user's entered design choices.

Options 727 allow a user to enter design choices for a text string 726 embedded in environmental zone 719. Options 727 allow the user to set an offset of text string 726 from outer perimeter 723 and a color of characters include in text string 726.

Option 709 provides design choices for entering a background color for environmental zone 719. View 700 shows the user has selected a white background. Options 711 provide design choices for color gradients associated with text string 726 and perimeter 723.

Figure 7B:
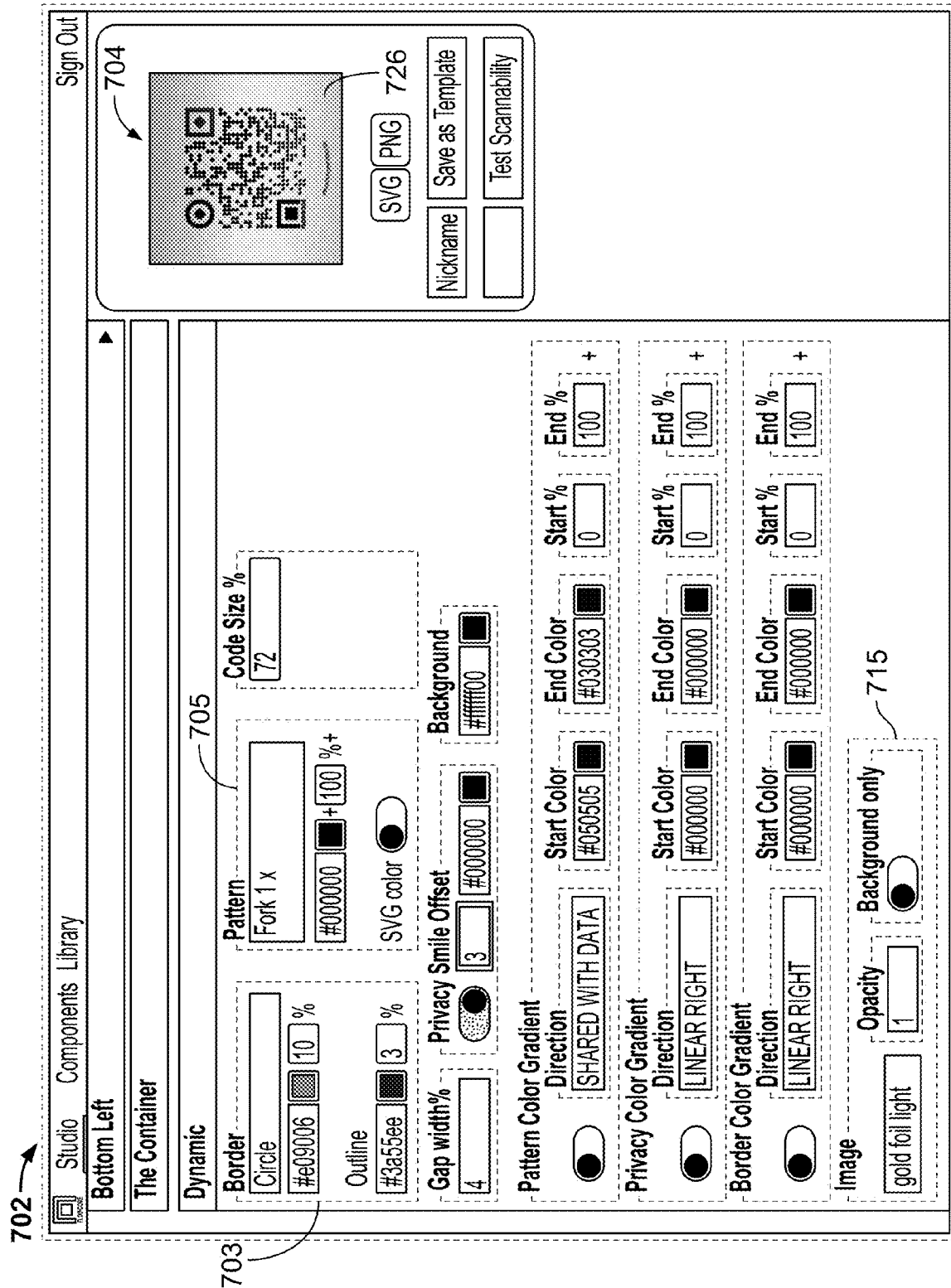

FIG. 7B shows view 702 of design choices that may be applied to an environmental zone. View 702 shows that design choices entered for environmental zone modules of QR code 704 using options 703 and 705 have been partially overridden by selecting an image "gold foil light" using option 715. However, view 702 shows that the circular shaped perimeter entered using options 703 has been preserved in QR code 704 which includes text string 726, as formatted for a circular outer perimeter.

Figure 7C:
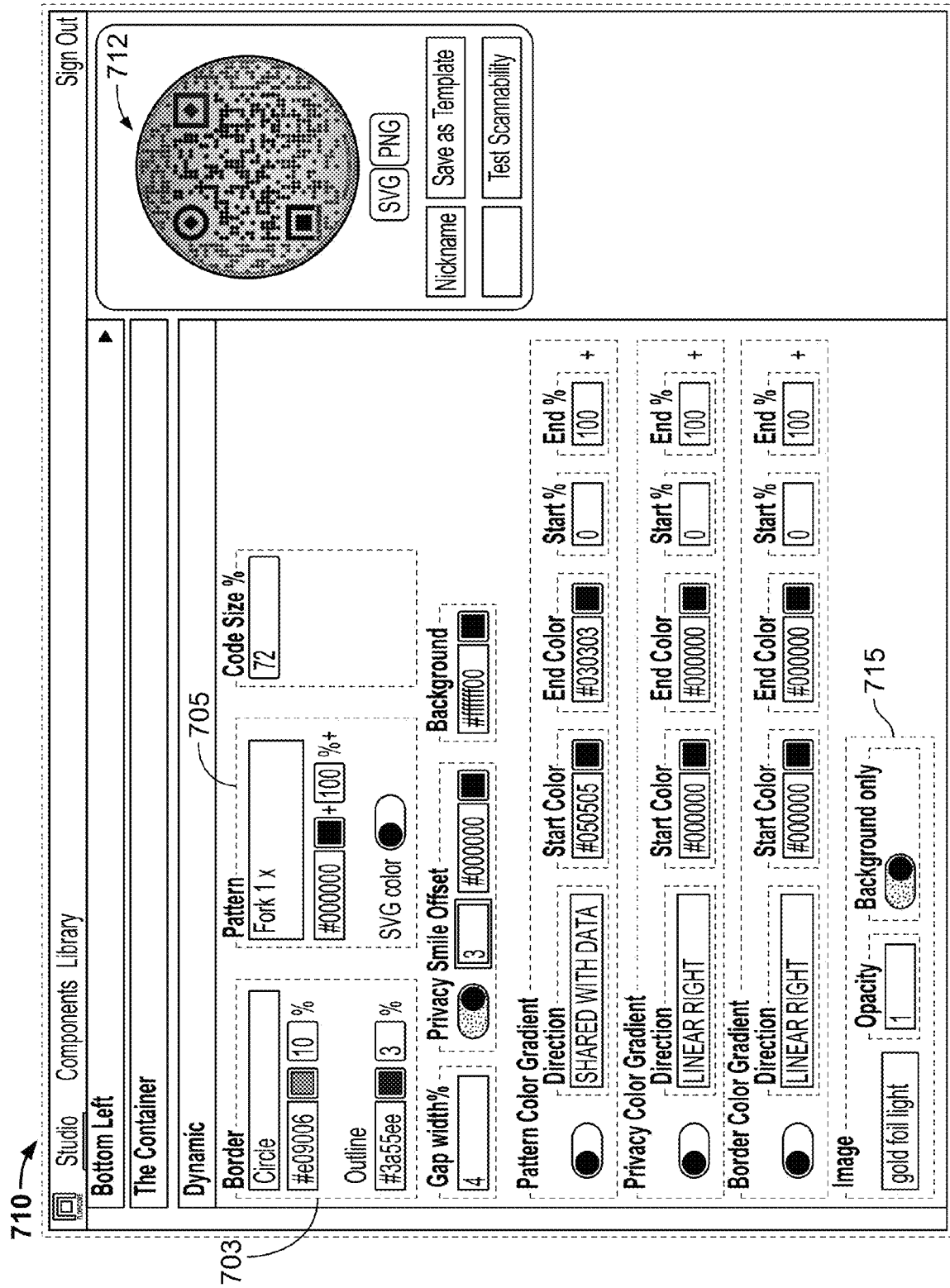

FIG. 7C shows view 710 of design choices applied to environmental zone of QR code 712. View 710 shows that in options 715, the image "gold foil light" is only applied to the background of the environmental zone. Option 715 allows a user to hide or show modules of an environmental zone. When "background only" is entered, the image selected using option 715 may be used for the background color, and as shown in QR code 712, modules of the environmental zone selected using 705 (e.g., Fork 1 shape) remain visible.

Figure 7D:
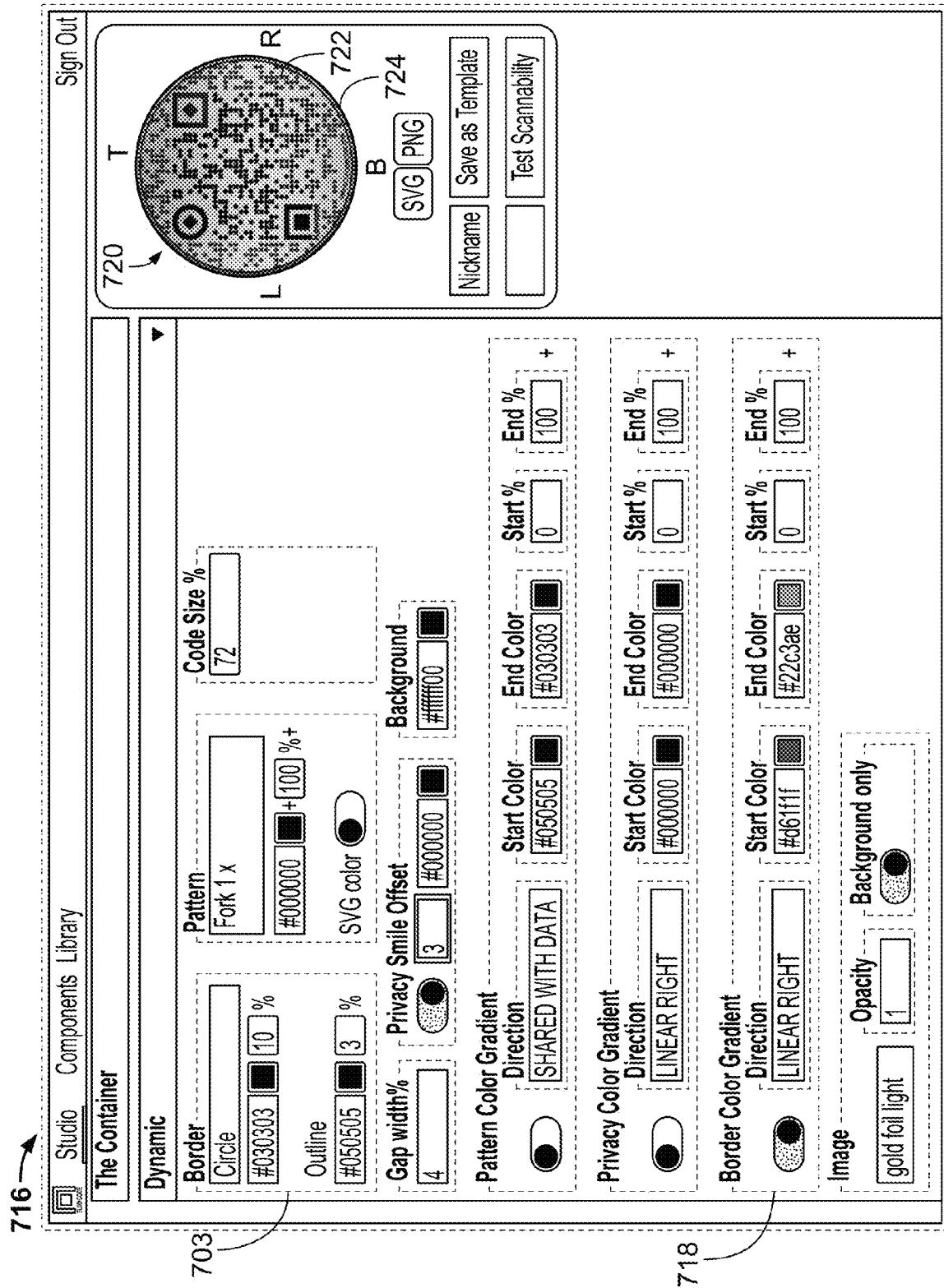

FIG. 7D shows view 716 of design choices applied environmental zone 724 of QR code 720. View 716 shows that using options 718, a color gradient has been applied to a fill color of outer perimeter 724. View 716 shows that the fill color of outer perimeter 724 starts at color #d61f1f (red) on left-side L of QR code 720 and transitions to color #22c3ae (teal) on a right-side of QR code 720. Options 718 allows the user to select a blending ratio for the selected colors. View 716 shows the user has selected start percentage of 0% and an end percentage of 100%.

Figure 8:
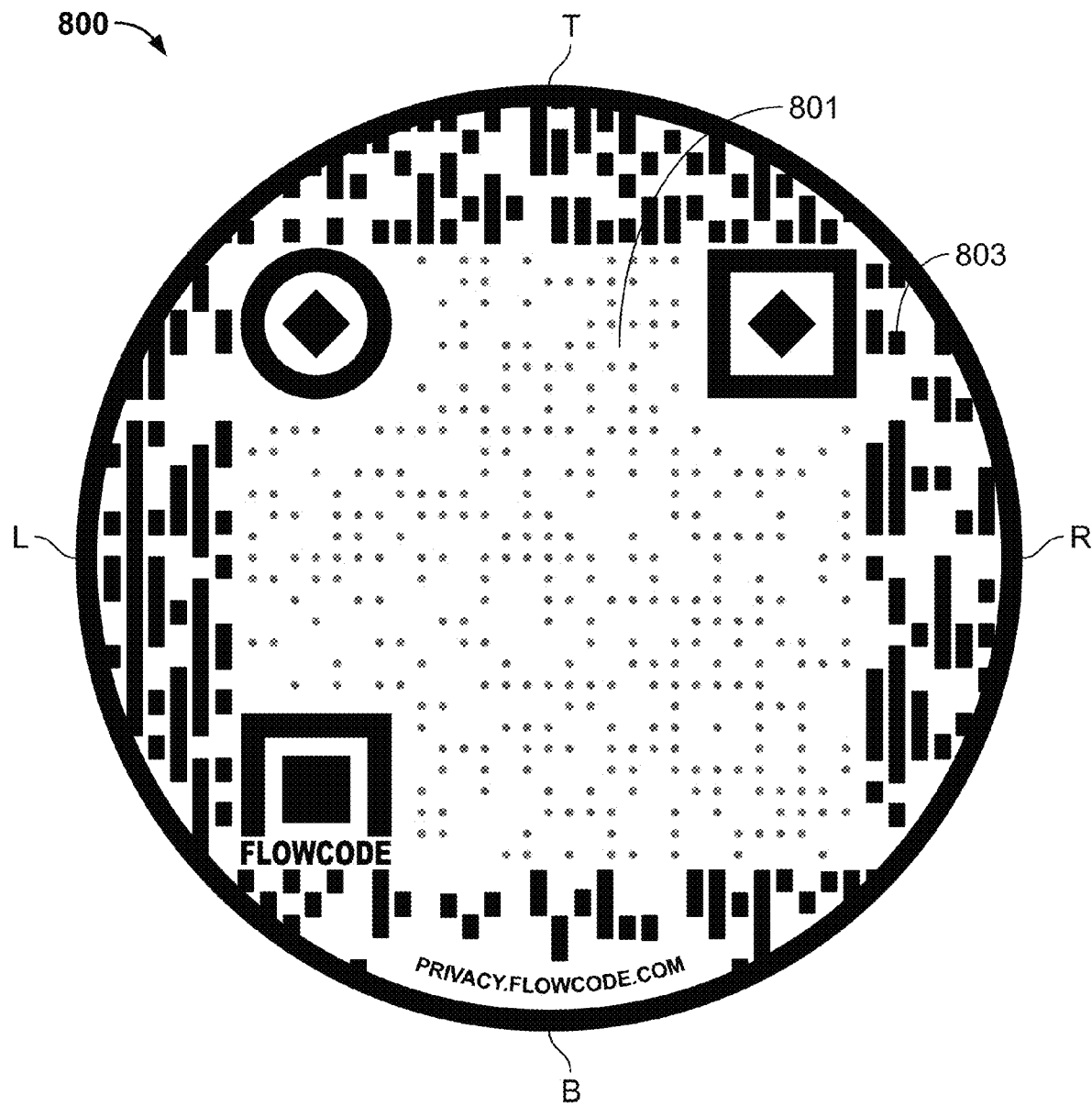
FIGS. 8-9 show illustrative machine-readable labels generated in accordance with principles of the disclosure.

FIG. 8 shows illustrative QR code 800 generated using apparatus and methods described herein. FIG. 8 shows that QR code 800 includes environmental zone 803 and data zone 801. Modules included in environmental zone 803 have different shapes, sizes an and color than modules included in data zone 801. A user may enter design choices for environmental zone 803 and data zone 801 using UIs and software tools shown above in FIGS. 4-7D.

AI engine 209 may arrange modules of data zone 801 such that data zone 801 is reliably scannable within a threshold time limit and includes a threshold error correction level. AI engine 209 may arrange modules of environmental zone 803 and data zone 801 such that modules of environmental zone 803 do not interfere with reliable scanning of data zone 801.

Figure 9:
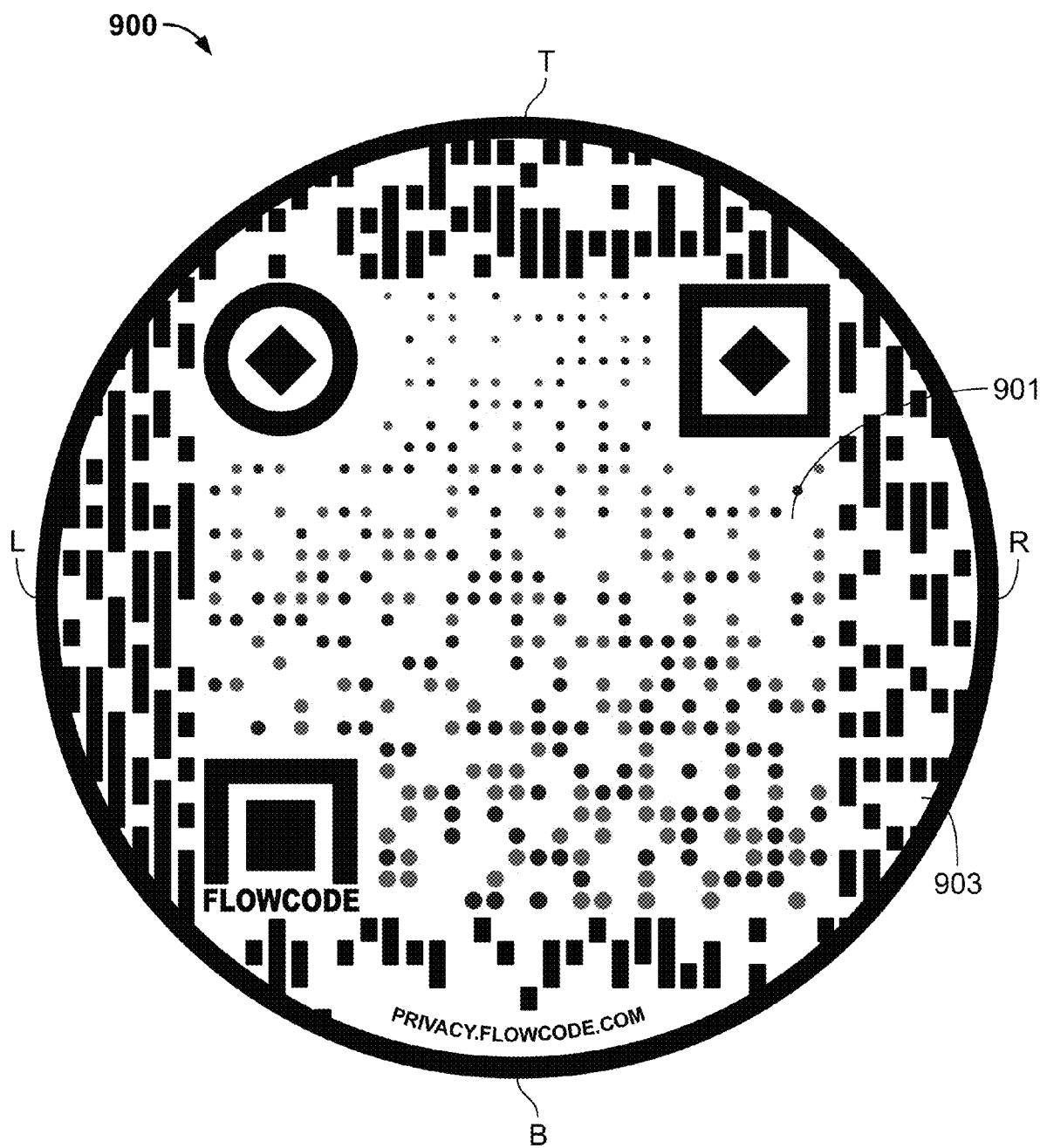

FIG. 9 shows illustrative QR code 900 generated using apparatus and methods described herein. FIG. 9 shows that QR code 900 includes environmental zone 903 and data zone 901. Modules included in environmental zone 903 have different shapes, sizes and color than modules in data zone 901. A user may enter design choices for environmental zone 903 and data zone 901 using UIs and software tools shown above in FIGS. 4-7D.

AI engine 209 may arrange the modules of data zone 901 such that data zone 901 is reliably scannable within a threshold time limit and includes a threshold error correction level. AI engine 209 may arrange modules within environmental zone 903 and data zone 901 such that environmental zone 903 does not interfere with the reliable scanning of data zone 901.

FIG. 9 shows a size gradient has been applied to modules within data zone 901. Modules near bottom B of QR code 900 are larger in size than modules within data zone 801 (shown in FIG. 8). Modules within data zone 901 decrease in size moving along a directional pathway from bottom B toward top T of QR code 900. FIG. 9 also shows that an arrangement of modules within environmental zone 903 is different than the arrangement of modules within environmental zone 803 (shown in FIG. 8). AI engine 209 may arrange modules within environmental zone 903 based on design choices entered for environmental zone 903. AI engine 209 may arrange modules within environmental zone 903 based on design choices entered for data zone 901.

A computer program listing is included as an appendix to this disclosure. The computer program listing includes illustrative source code for implementing an illustrative machine-readable optical label generator in accordance with principles of this disclosure.

Thus, methods and apparatus for MACHINE-READABLE LABEL GENERATOR are provided. Persons skilled in the art will appreciate that the present invention can be practiced by other than the described embodiments, which are presented for purposes of illustration rather than of limitation, and that the present invention is limited only by the claims that follow.

What is claimed is:

1. An artificial intelligence ("AI") method for generating a quick-response ("QR") code, the method comprising:
   receiving an image;
   identifying a color in the image;
   generating a quick response ("QR") code based on the color; and
   computing how to apply the color to a module of the QR code such that the QR code is associated with a threshold level of error correction,
   wherein generating the QR code comprises generating a data zone that:
   triggers a target action when scanned; and
   is scannable within a target time window.

2. The AI method of claim 1 wherein generating the QR code further comprises computationally altering the color.

3. The AI method of claim 2 wherein computationally altering the color comprises changing hue, tint, shade, tone, saturation, lightness, chromaticity or intensity associated with the color.

4. The AI method of claim 1 further comprising:
applying computational aesthetic techniques to define an aesthetic appearance associated with the image; and
generating the QR code based on the aesthetic appearance.

5. The AI method of claim 4 wherein the aesthetic appearance includes a modification to the color.

6. The AI method of claim 4 wherein generating the QR code based on the aesthetic appearance comprises computing a color for each module in the QR code such that the QR code conforms to the aesthetic appearance.

7. The AI method of claim 1 wherein generating the QR code comprises computing a shape and size of each module within the QR code.

8. An artificial intelligence ("AI") method for generating a quick-response ("QR") code, the method comprising:
receiving an image;
identifying a color in the image;
generating a quick response ("QR") code based on the color, wherein generating the QR code comprises generating an environmental zone based on the color.

9. An artificial intelligence ("AI") method for generating a quick-response ("QR") code, the method comprising:
receiving an image;
identifying a color in the image;
generating a quick response ("QR") code based on the color, wherein generating the QR code further comprises applying a mask pattern that ensures the QR code does not include a threshold number of adjacent modules having the color.

10. A software platform for generating a quick-response ("QR") code, the software platform comprising:
a user interface programmed to receive an image; and
an artificial intelligence ("AI") software engine that generates a machine-readable label based on the image, the machine-readable label comprising a data zone that includes error correction code capable of restoring a threshold percentage of instructions encoded in the data zone,
wherein the AI software engine generates the machine-readable label that is scannable within a threshold time limit and the error correction code is capable of restoring at least 15% of instructions encoded in the data zone.

11. The software platform of claim 10 wherein the AI software engine incorporates a color in the image into the machine-readable label.

12. The software platform of claim 10 wherein the AI software engine generates the machine-readable label by:
applying a machine-generated change to a color included in the image; and
incorporating the machine-generated change into the machine-readable label.

13. The software platform of claim 10 wherein the AI software engine computes a color for each module in the machine-readable label.

14. The software platform of claim 10 wherein the AI software engine:
alters one or more of: hue, tint, shade, tone, saturation, lightness, chromaticity and intensity of a color included in the image; and
includes alterations to the color in the machine-readable label.

15. The software platform of claim 10 wherein the AI software engine computes a color for each module in the machine-readable label by computing how the color impacts human aesthetic judgment.

16. A software platform for generating a quick-response ("QR") code, the software platform comprising:
a user interface programmed to receive an image; and
an artificial intelligence ("AI") software engine that generates a machine-readable label based on the image, the machine-readable label comprising a data zone that includes error correction code capable of restoring a threshold percentage of instructions encoded in the data zone, wherein the AI software engine:
generates an environmental zone for the machine-readable label; and
to a human eye, the environmental zone appears to be a contiguous extension of the data zone.

17. A software platform for generating a quick-response ("QR") code, the software platform comprising:
a user interface programmed to receive an image; and
an artificial intelligence ("AI") software engine that generates a machine-readable label based on the image, the machine-readable label comprising a data zone that includes error correction code capable of restoring a threshold percentage of instructions encoded in the data zone, wherein:
the data zone comprises a timing pattern and an alignment pattern; and
the instructions encoded in the data zone, when scanned, trigger a target action.

18. An artificial intelligence ("AI") method for generating a quick-response ("QR") code, the method comprising:
receiving user-input design choices;
computationally generating an aesthetic appearance that includes a change to at least one of the user-input design choices; and
generating a quick response ("QR") code based on the aesthetic appearance, wherein the QR code includes a data zone having error correction code that is capable of restoring at least 15% of instructions encoded in the data zone.

19. The AI method of claim 18 wherein computationally generating the aesthetic appearance comprises altering a color included in the user-input design choices.

20. The AI method of claim 18 wherein generating the QR code based on the aesthetic appearance comprises determining a color of each module in the QR code such that the QR code conforms to the aesthetic appearance.

21. The AI method of claim 18 wherein:
computationally generating the aesthetic appearance comprises defining how the user-input design choices impact human aesthetic judgment; and
generating the QR code based on how the user-input design choices impact human aesthetic judgment.

22. The AI method of claim 18 wherein the user-input design choices comprise an image.

23. The AI method of claim 18 wherein computationally generating the aesthetic appearance comprises modifying the user-input design choices such that readability of the QR code by a scanning device is enhanced over applying the user-input design choices without the change included in the aesthetic appearance.

24. The AI method of claim 18 wherein generating the QR code based on the aesthetic appearance comprises generating an environmental zone for the QR code and a data zone of the QR code based on the aesthetic appearance.

25. The AI method of claim 18 wherein generating the aesthetic appearance comprises changing hue, tint, shade, tone, saturation, lightness, chromaticity or intensity associated with a color included in the user-input design choices.

26. The AI method of claim 24 wherein the data zone comprises a timing pattern, an alignment pattern and encoded instructions that, when scanned, trigger a target action.

* * * * *